United States Patent
Kim

(10) Patent No.: US 12,340,618 B2
(45) Date of Patent: Jun. 24, 2025

(54) DISPLAY DEVICE

(71) Applicant: Samsung Display Co., Ltd., Yongin-Si (KR)

(72) Inventor: Chul Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/501,042

(22) Filed: Nov. 3, 2023

(65) Prior Publication Data

US 2024/0273939 A1  Aug. 15, 2024

(30) Foreign Application Priority Data

Feb. 10, 2023  (KR) ........................ 10-2023-0017798

(51) Int. Cl.
*G06V 40/12* (2022.01)
*G06F 3/041* (2006.01)
*G06F 3/044* (2006.01)
*G06V 40/13* (2022.01)
*G09G 3/3233* (2016.01)

(52) U.S. Cl.
CPC ...... *G06V 40/1347* (2022.01); *G06F 3/04182* (2019.05); *G06F 3/0443* (2019.05); *G06V 40/1318* (2022.01); *G09G 3/3233* (2013.01); *G09G 2300/0426* (2013.01); *G09G 2300/0819* (2013.01); *G09G 2300/0842* (2013.01); *G09G 2300/0861* (2013.01); *G09G 2310/08* (2013.01); *G09G 2354/00* (2013.01)

(58) Field of Classification Search
None
See application file for complete search history.

(56) References Cited

U.S. PATENT DOCUMENTS 9,775,528 B2  10/2017  Vermeulen et al.
2022/0137786 A1*  5/2022  Kim .................... G06F 3/04182
                                                                                              345/173

OTHER PUBLICATIONS

Jongpal Kim, Takhyung Lee, Jihoon Kim, and Hyoungho Ko, "Ambient light cancellation in photoplethysmogram application using alternating sampling and charge redistribution technique", IEEE Conf. EMBS, pp. 6441-6444, 4 pages, 2015, Milan, Italy.

* cited by examiner

*Primary Examiner* — Christopher J Kohlman
(74) *Attorney, Agent, or Firm* — Innovation Counsel LLP

(57) ABSTRACT

A display device is disclosed that includes a plurality of pixels and plurality of sensors. Each of the plurality of pixels includes a light emitting element. The plurality of sensors include first sensors disposed in a first area and second sensors disposed in a second area. Each of the plurality of sensors includes a light receiving element. The scan driver supplies a plurality of scan signals to the plurality of pixels and the plurality of sensors. In response to the plurality of scan signals, the readout circuit receives a first sensing signal from the first sensors, receives a second sensing signal from the second sensors, and removes noise from the first sensing signal using the second sensing signal to produce a final sensing signal.

20 Claims, 16 Drawing Sheets

DISPLAY DEVICE

CROSS-REFERENCE TO RELATED APPLICATIONS

This application claims priority under 35 U.S.C. § 119 to Korean Patent Application No. 10-2023-0017798 filed on Feb. 10, 2023, in the Korean Intellectual Property Office, the disclosures of which are incorporated by reference herein in their entireties.

BACKGROUND

Embodiments of the present disclosure relate to a display device, and more particularly, relate to a display device capable of detecting information provided by a user.

A display device provides various functions to provide information to a user by displaying an image or to communicate organically with the user, such as detecting a user input. Nowadays, display devices include a function to detect information (e.g., biometric information) provided by a user.

A method of recognizing user information include a capacitive scheme that detects a change in capacitance between electrodes, an optical scheme that detects incident light by using an optical sensor, and an ultrasonic scheme that detects vibration by using a piezoelectric material or the like.

SUMMARY

Embodiments of the present disclosure may provide a display device capable of accurately recognizing information provided by a user by removing ambient noise.

According to an embodiment, a display device includes a display panel, a scan driver, and a readout circuit. The display panel includes a plurality of pixels and a plurality of sensors. Each of the plurality of pixels includes a light emitting element. The plurality of sensors include first sensors disposed in a first area and second sensors disposed in a second area. Each of the plurality of sensors includes a light receiving element. The scan driver supplies a plurality of scan signals to the plurality of pixels and the plurality of sensors. In response to the plurality of scan signals, the readout circuit receives a first sensing signal from the first sensors, receives a second sensing signal from second sensors, and removes noise from the first sensing signal using the second sensing signal to produce a final sensing signal.

According to an embodiment, a display device includes a display panel, an input sensing layer, a scan driver, and a main controller. The display panel includes a plurality of pixels and a plurality of pixels. Each of the plurality of pixels includes a light emitting element. Each of the plurality of sensors includes a light receiving element. The input sensing layer is positioned on the display panel and senses an input and outputs an input sensing signal. The scan driver supplies a plurality of scan signals to the plurality of pixels and the plurality of sensors. The main controller sets a first area and a second area of the display panel using the input sensing signal and receives a first sensing signal from first sensors positioned in the first area in response to some of the plurality of scan signals. The main controller receives a second sensing signal from second sensors positioned in the second area in response to some of the plurality of scan signals and removes noise from the first sensing signal using the second sensing signal to produce a final sensing signal.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
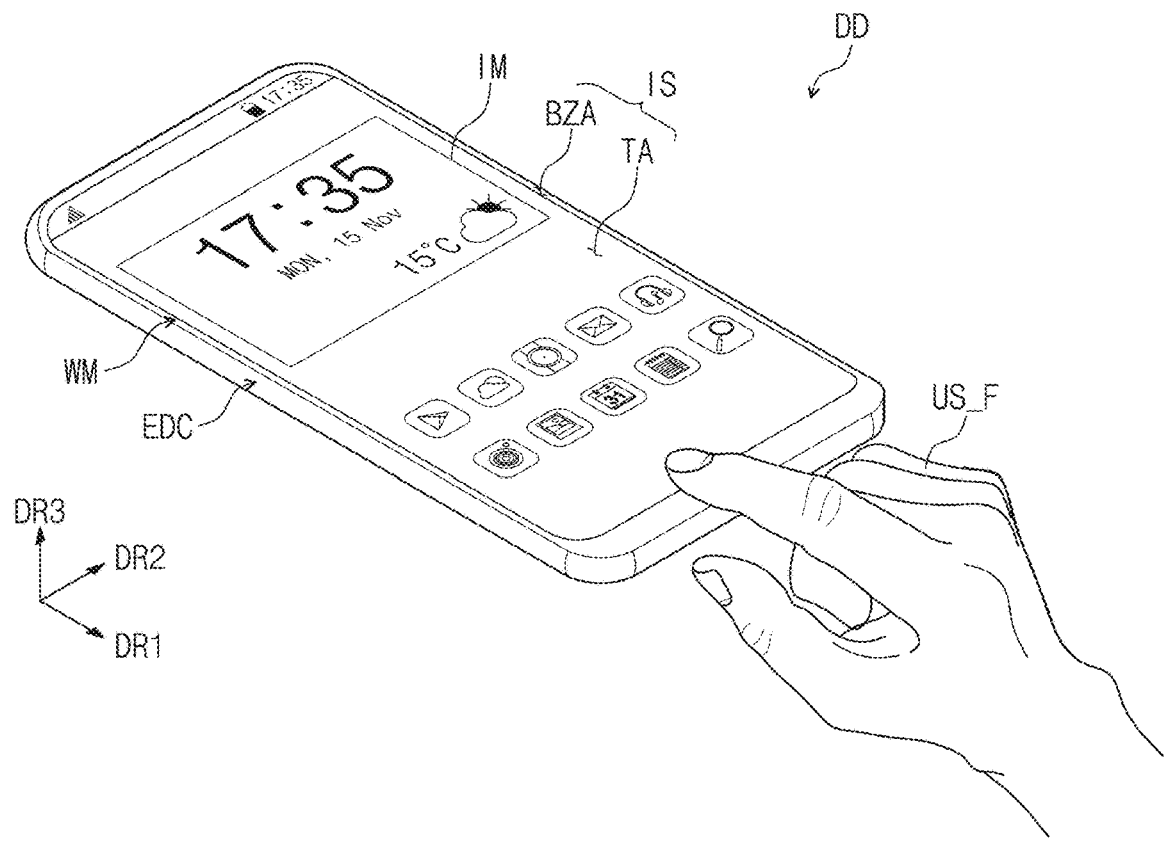
FIG. 1 is a perspective view of a display device, according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

Although the terms "first", "second", etc. may be used to describe various components, the components should not be construed as being limited by the terms. The terms are only used to distinguish one component from another component.

For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 2:
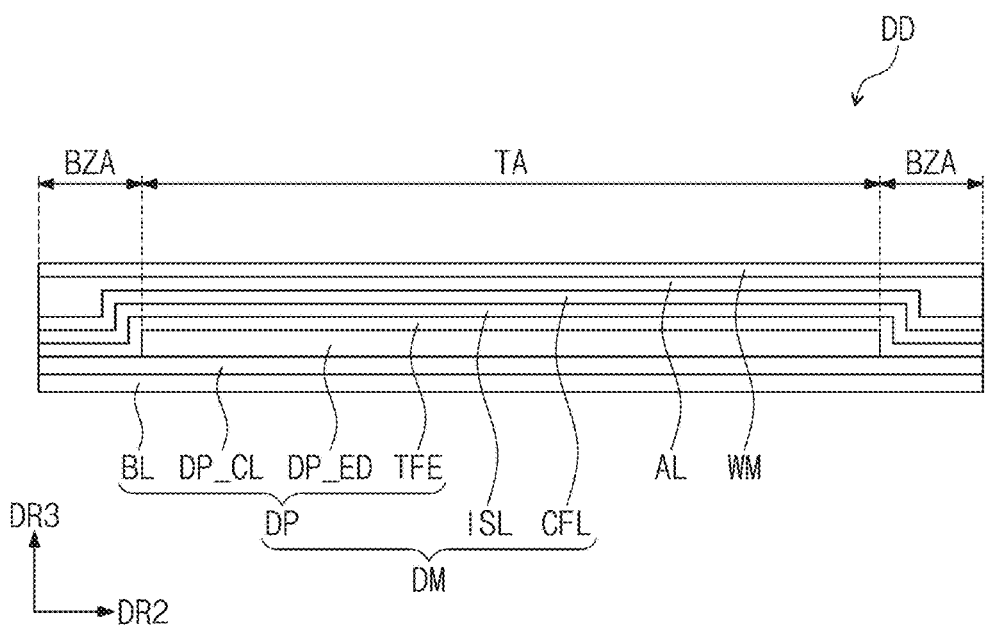
FIG. 2 is a cross-sectional view of a display device, according to an embodiment of the present disclosure.

FIG. 1 is a perspective view of a display device, according to an embodiment of the present disclosure. FIG. 2 is a cross-sectional view of a display device, according to an embodiment of the present disclosure.

Referring to FIGS. 1 and 2, a display device DD according to an embodiment of the present disclosure may have a shape of a rectangle having a long side parallel to a first direction DR1 and a short side parallel to a second direction DR2 intersecting the first direction DR1. However, an embodiment is not limited thereto. For example, the display device DD may have various shapes such as a circle and a polygon.

The display device DD may be a device activated depending on an electrical signal. The display device DD may include various embodiments. For example, the display device DD may be applied to an electronic device such as a smart watch, a tablet PC, a notebook computer, a computer, a smart television, or the like.

Hereinafter, a normal direction substantially perpendicular to a plane defined by the first direction DR1 and the second direction DR2 is defined as a third direction DR3. In the specification, the meaning of "when viewed from above a plane" may mean "when viewed in the third direction DR3".

A top surface of the display device DD may be defined as a display surface IS, and may be parallel to a plane defined by the first direction DR1 and the second direction DR2. Images IM generated by the display device DD may be provided to a user through the display surface IS.

The display surface IS may be divided into a transmission area TA and a bezel area BZA. The transmission area TA may be an area in which the images IM are displayed. The user visually perceives the images IM through the transmission area TA. In an embodiment, the transmission area TA is illustrated in the shape of a quadrangle whose corners are rounded. However, this is illustrated as an example. The transmission area TA may have various shapes, not limited to an embodiment.

The bezel area BZA is adjacent to the transmission area TA. The bezel area BZA may have a predetermined color. The bezel area BZA may surround the transmission area TA. Accordingly, the shape of the transmission area TA may be substantially defined by the bezel area BZA. However, this is illustrated as an example. For example, the bezel area BZA may be disposed adjacent to only one side of the transmission area TA or may be omitted.

The display device DD may sense an external input applied from the outside. The external input may include various types of inputs that are provided from the outside of the display device DD. For example, as well as a contact by a part of a body such as a body part US_F (e.g., a hand) of the user or a contact by a separate device (e.g., an active pen or a digitizer), the external input may include an external input (e.g., hovering) applied when the user's hand US_F approaches the display device DD or is adjacent to the display device DD within a predetermined distance. In addition, the external input may have various types such as force, pressure, temperature, light, and the like.

The display device DD may detect the user's biometric information applied from the outside. A biometric information sensing area capable of detecting the user's biometric information may be provided to the display surface IS of the display device DD. The biometric information sensing area may be provided in the entire area of a transmission area TA or may be provided in a partial area of the transmission area TA. As an example of the present disclosure, FIG. 1 illustrates that the entire transmission area TA is utilized as the biometric information sensing area.

The display device DD may include a window WM, a display module DM, and housing EDC. In an embodiment, an appearance of the display device DD may be implemented by coupling the window WM and the housing EDC.

A front surface of the window WM defines the display surface IS of the display device DD. The window WM may include an optically transparent insulating material. For example, the window WM may include glass or plastic. The window WM may include a multi-layer structure or a single layer structure. For example, the window WM may include a plurality of plastic films bonded to each other by an adhesive or may have a glass substrate and a plastic film bonded to each other by an adhesive.

The display module DM may include a display panel DP and an input sensing layer ISL. The display panel DP may display an image in response to an electrical signal. The input sensing layer ISL may sense an external input applied from the outside. The external input may be provided in various forms. The input sensing layer ISL may be activated in an input sensing mode.

The display panel DP according to an embodiment of the present disclosure may be a light emitting display panel, and is not particularly limited thereto. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, and the like. Hereinafter, it is described that the display panel DP is an organic light emitting display panel.

Referring to FIG. 2, the display panel DP includes a base layer BL, a circuit layer DP_CL, an element layer DP_ED, and an encapsulation layer TFE. The display panel DP according to an embodiment of the present disclosure may be a flexible display panel. However, the present disclosure is not limited thereto. For example, the display panel DP may be a foldable display panel, which is folded with respect to a folding axis, or a rigid display panel.

The base layer BL may include a synthetic resin layer. The synthetic resin layer may be a polyimide-based resin layer, and the material thereof is not particularly limited thereto. Besides, the base layer BL may include a glass substrate, a metal substrate, an organic/inorganic composite substrate, or the like.

The circuit layer DP_CL is disposed on the base layer BL. The circuit layer DP_CL is interposed between the base layer BL and the element layer DP_ED. The circuit layer DP_CL includes at least one insulating layer and a circuit element. Hereinafter, the insulating layer included in the circuit layer DP_CL is referred to as an "intermediate insulating layer". The intermediate insulating layer includes at least one intermediate inorganic film and at least one intermediate organic film. The circuit element may include a pixel driving circuit, which is included in each of a plurality of pixels for displaying an image, and a sensor driving circuit, which is included in each of a plurality of sensors for recognizing external information. The external information may be biometric information. As an example of the present disclosure, the sensor may be a fingerprint recognition sensor, a proximity sensor, an iris recognition sensor, a blood pressure measurement sensor, a pulse wave sensor, or an illuminance sensor. Furthermore, the sensor may be an optical sensor that recognizes the biometric information in an optical scheme. The circuit layer DP_CL may further include signal lines connected to the pixel driving circuit and the sensor driving circuit.

The element layer DP_ED may include a light emitting element included in each of the pixels and a light receiving element included in each of the sensors. As an example of the present disclosure, the light receiving element may be a photodiode. The light receiving element may be a sensor that detects or responds to light reflected by a user's fingerprint. The circuit layer DP_CL and the element layer DP_ED will be described in detail later with reference to FIG. 6.

The encapsulation layer TFE encapsulates the element layer DP_ED. The encapsulation layer TFE may include at least one organic film and at least one inorganic film. The inorganic film may include inorganic materials and may protect the element layer DP_ED from moisture/oxygen. The inorganic film may include a silicon nitride layer, a silicon oxynitride layer, a silicon oxide layer, a titanium oxide layer, an aluminum oxide layer, or the like, but not limited particularly thereto. The organic film may include organic materials and may protect the element layer DP_ED from foreign objects such as dust particles.

The input sensing layer ISL may be formed on the display panel DP. The input sensing layer ISL may be disposed directly on the encapsulation layer TFE. According to an embodiment of the present disclosure, the input sensing layer ISL may be formed on the display panel DP through subsequent processes. In other words, when the input sensing layer ISL is directly disposed on the display panel DP, an adhesive film is not interposed between the input sensing layer ISL and the encapsulation layer TFE. Alternatively, the adhesive film may be interposed between the input sensing layer ISL and the display panel DP. In this case, the input sensing layer ISL is not manufactured by a process continuous to that of the display panel DP. That is, the input sensing layer ISL may be manufactured through a process separate from that of the display panel DP and may then be fixed on an upper surface of the display panel DP by the adhesive film.

The input sensing layer ISL may sense an external input (e.g., a user's touch), may change the sensed input into a predetermined input signal, and may provide the input signal to the display panel DP. The input sensing layer ISL may include a plurality of sensing electrodes for sensing an external input. The sensing electrodes may sense the external input in a capacitive scheme. The display panel DP may receive an input signal from the input sensing layer ISL and may generate an image corresponding to the input signal.

The display module DM may further include a color filter layer CFL. As an example of the present disclosure, the color filter layer CFL may be disposed on the input sensing layer ISL. However, the present disclosure is not limited thereto. The color filter layer CFL may be interposed between the display panel DP and the input sensing layer ISL. The color filter layer CFL may include a plurality of color filters and a black matrix.

Details of the structure of the input sensing layer ISL and the color filter layer CFL will be described later.

The display device DD according to an embodiment of the present disclosure may further include an adhesive layer AL. The window WM may be attached to the input sensing layer ISL by the adhesive layer AL. The adhesive layer AL may include an optical clear adhesive, an optically clear adhesive resin, or a pressure sensitive adhesive (PSA).

The housing EDC is coupled to the window WM. The housing EDC is coupled to the window WM to provide predetermined inner space. The display module DM may be accommodated in the inner space. The housing EDC may include a material having relatively high rigidity. For example, the housing EDC may include glass, plastic, or metal or may include a plurality of frames or plates that are composed of a combination thereof. The housing EDC may stably protect configurations of the display device DD accommodated in the inner space from an external impact. Although not illustrated in drawings, a battery module for supplying power required for overall operations of the display device DD may be interposed between the display module DM and the housing EDC.

Figure 3:
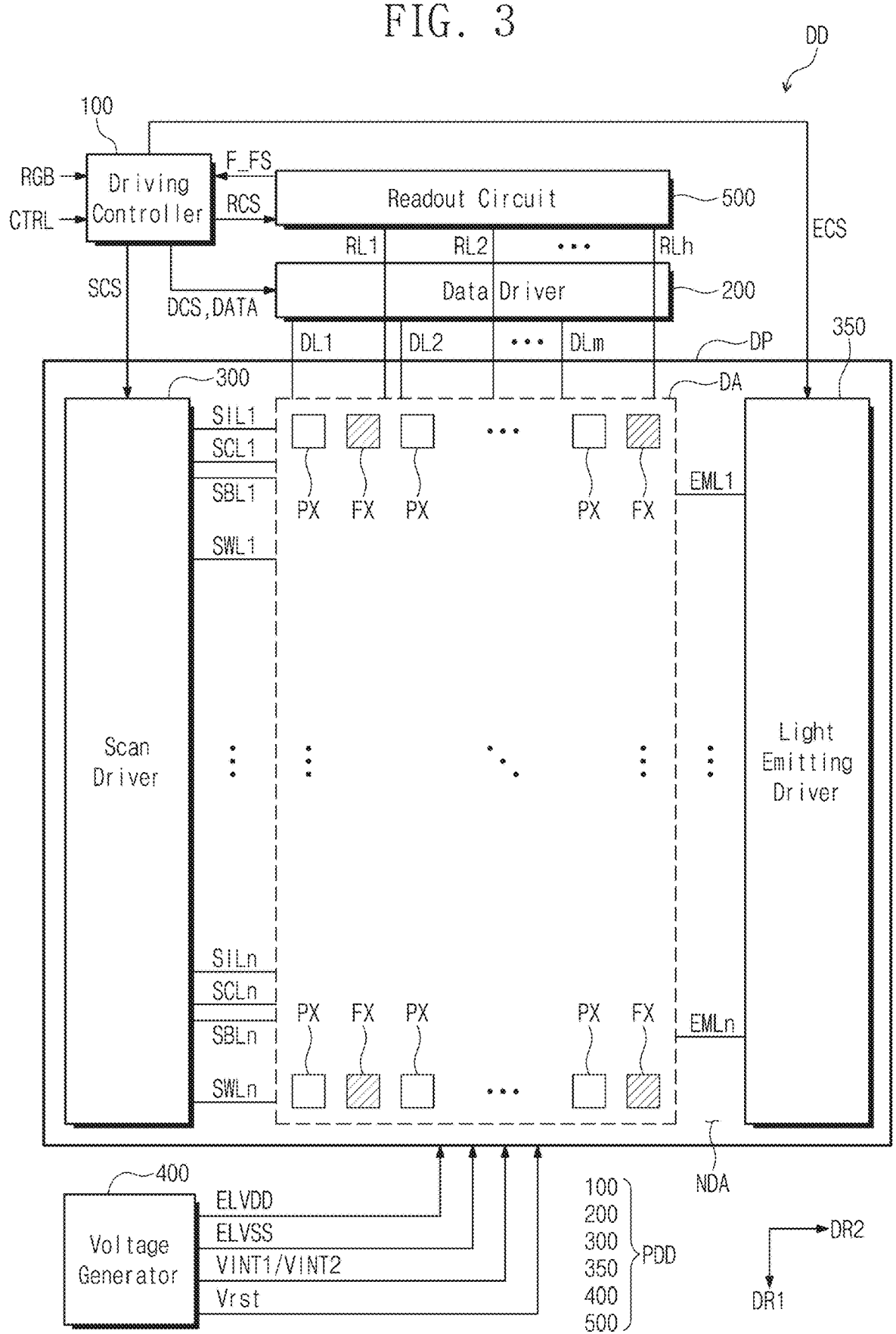
FIG. 3 is a block diagram of a display device, according to an embodiment of the present disclosure.

FIG. 3 is a block diagram of a display device, according to an embodiment of the present disclosure.

Referring to FIG. 3, the display device DD includes the display panel DP and a panel driver PDD. As an example of the present disclosure, the panel driver PDD includes a driving controller 100, a data driver 200, a scan driver 300, a light emitting driver 350, a voltage generator 400, and a readout circuit 500.

The driving controller 100 receives an image signal RGB and a control signal CTRL. The driving controller 100 generates image data signal DATA by converting the data format of the image signal RGB to be suitable for the interface specification of the data driver 200. The driving controller 100 outputs a first control signal SCS, a second control signal ECS, a third control signal DCS, and a fourth control signal RCS.

The data driver 200 receives the third control signal DCS and the image data signal DATA from the driving controller 100. The data driver 200 converts the image data signal DATA into data signals and outputs the data signals to a plurality of data lines DL1 to DLm to be described later. The data signals refer to analog voltages corresponding to gray-scale values of the image data signal DATA.

The scan driver 300 receives the first control signal SCS from the driving controller 100. The scan driver 300 may output scan signals to scan lines in response to the first control signal SCS.

The voltage generator 400 generates voltages necessary to operate the display panel DP. In an embodiment, the voltage generator 400 generates a first driving voltage ELVDD, a second driving voltage ELVSS, a first initialization voltage VINT1, and a second initialization voltage VINT2.

The display panel DP may include a display area DA corresponding to the transmission area TA (as illustrated in FIG. 1) and a non-display area NDA corresponding to the bezel area BZA (as illustrated in FIG. 1).

The display panel DP may include a plurality of pixels PX disposed in the display area DA and a plurality of sensors FX disposed in the display area DA. In an embodiment of the present disclosure, each of the plurality of sensors FX may be interposed between two pixels PX adjacent to each other. The plurality of pixels PX and the plurality of sensors FX may be alternately disposed on a plane defined in the first and second directions DR1 and DR2. However, the present disclosure is not limited thereto. That is, two or more pixels PX may be positioned between two sensors FX adjacent to each other in the first direction DR1 among the plurality of sensors FX. Alternatively, two or more pixels PX may be positioned between two sensors FX adjacent to each other in the second direction DR2 among the plurality of sensors FX.

The display panel DP further includes initialization scan lines SIL1 to SILn, compensation scan lines SCL1 to SCLn, write scan lines SWL1 to SWLn, black scan lines SBL1 to SBLn, emission control lines EML1 to EMLn, data lines DL1 to DLm, and readout lines RL1 to RLh. The initialization scan lines SIL1 to SILn, the compensation scan lines SCL1 to SCLn, the write scan lines SWL1 to SWLn, the black scan lines SBL1 to SBLn, and the emission control lines EML1 to EMLn extend in the second direction DR2. The initialization scan lines SIL1 to SILn, the compensation scan lines SCL1 to SCLn, the write scan lines SWL1 to SWLn, the black scan lines SBL1 to SBLn, and the emission control lines EML1 to EMLn are arranged spaced from one another in the first direction DR1. The data lines DL1 to DLm and the readout lines RL1 to RLh extend in the first direction DR1 and are arranged spaced from one another in the second direction DR2.

The plurality of pixels PX are electrically connected to the initialization scan lines SIL1 to SILn, the compensation scan lines SCL1 to SCLn, the write scan lines SWL1 to SWLn, the black scan lines SBL1 to SBLn, the emission control lines EML1 to EMLn, and the data lines DL1 to DLm. For example, each of the plurality of pixels PX may be electrically connected with four scan lines. However, the number of scan lines connected to each pixel PX is not limited thereto, and may be changed.

The plurality of sensors FX are electrically connected to the write scan lines SWL1 to SWLn and the readout lines RL1 to RLh. Each of the plurality of sensors FX may be electrically connected to one scan line. However, the present disclosure is not limited thereto. The number of scan lines connected to each of the sensors FX may be changed. As an example of the present disclosure, the number of readout lines RL1 to RLh may be less than or equal to the number of data lines DL1 to DLm. For example, the number of the readout lines RL1 to RLh may correspond to ½, ¼, or ⅛ of the number of the data lines DL1 to DLm.

The scan driver 300 may be disposed in the non-display area NDA of the display panel DP. The scan driver 300 receives the first control signal SCS from the driving controller 100. In response to the first control signal SCS, the scan driver 300 outputs initialization scan signals to the initialization scan lines SIL1 to SILn and outputs compensation scan signals to the compensation scan lines SCL1 to SCLn. Furthermore, in response to the first control signal SCS, the scan driver 300 may output write scan signals to the write scan lines SWL1 to SWLn and may output black scan signals to the black scan lines SBL1 to SBLn. Alternatively, the scan driver 300 may include a first scan driver and a second scan driver. The first scan driver may output the initialization scan signals and the compensation scan signals. The second scan driver may output the write scan signals and the black scan signals.

The light emitting driver 350 may be disposed in the non-display area NDA of the display panel DP. The light emitting driver 350 receives the second control signal ECS from the driver controller 100. The light emitting driver 350 may output emission control signals to the emission control lines EML1 to EMLn in response to the second control signal ECS. Alternatively, the scan driver 300 may be connected to the emission control lines EML1 to EMLn. In this case, the light emitting driver 350 may be omitted, and the scan driver 300 may output the emission control signals to the emission control lines EML1 to EMLn.

The readout circuit 500 receives the fourth control signal RCS from the driving controller 100. The readout circuit 500 may receive sensing signals from the readout lines RL1 to RLh in response to the fourth control signal RCS. The readout circuit 500 may process sensing signals received from the readout lines RL1 to RLh to output a final sensing signal F_FS and may provide the final sensing signal F_FS to the driving controller 100. The driving controller 100 may recognize user information (e.g., a user's biometric information) based on the final sensing signal F_FS.

Figure 4:
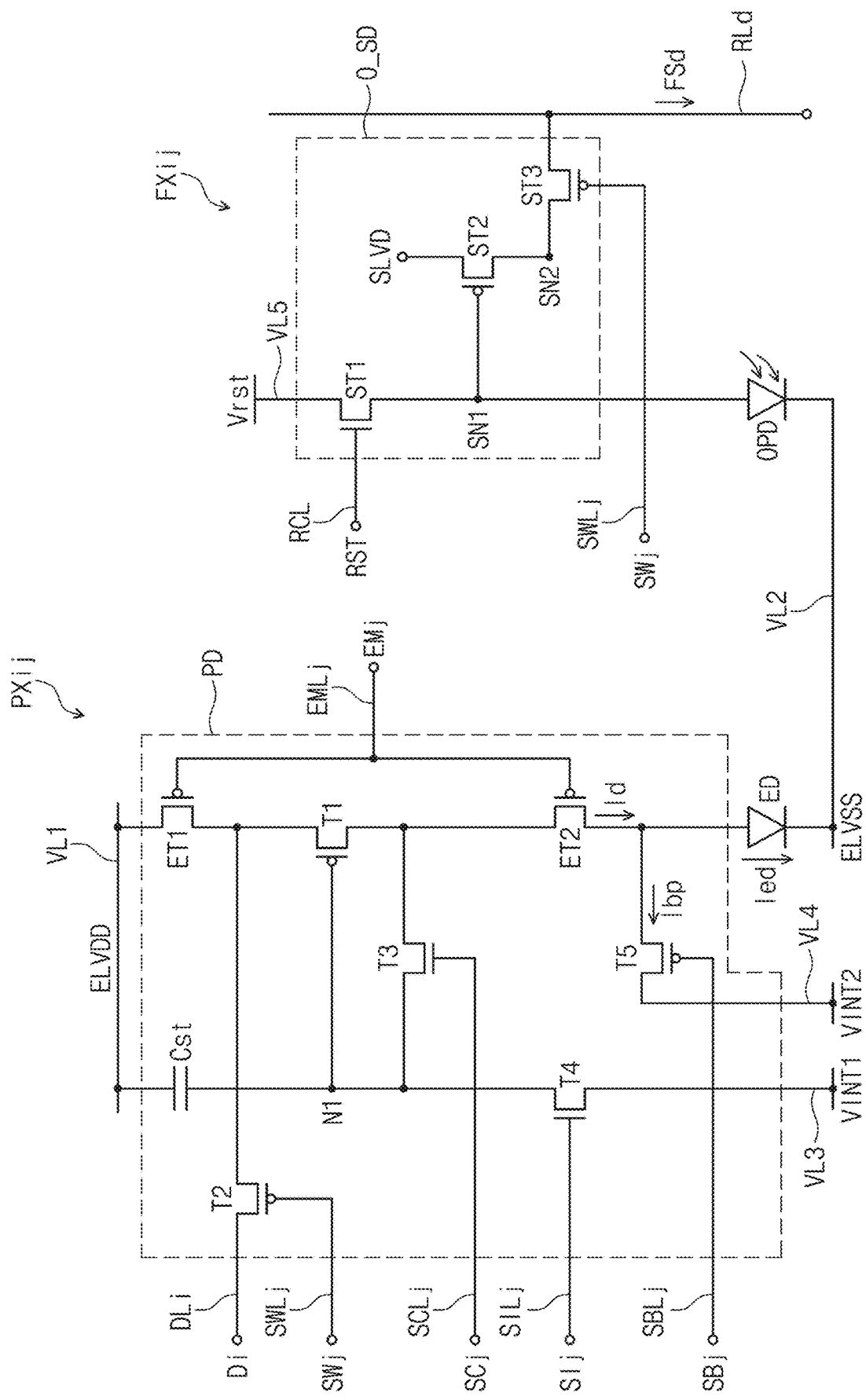
FIG. 4 is a circuit diagram of a pixel and a sensor, according to an embodiment of the present disclosure.
Figure 5A:
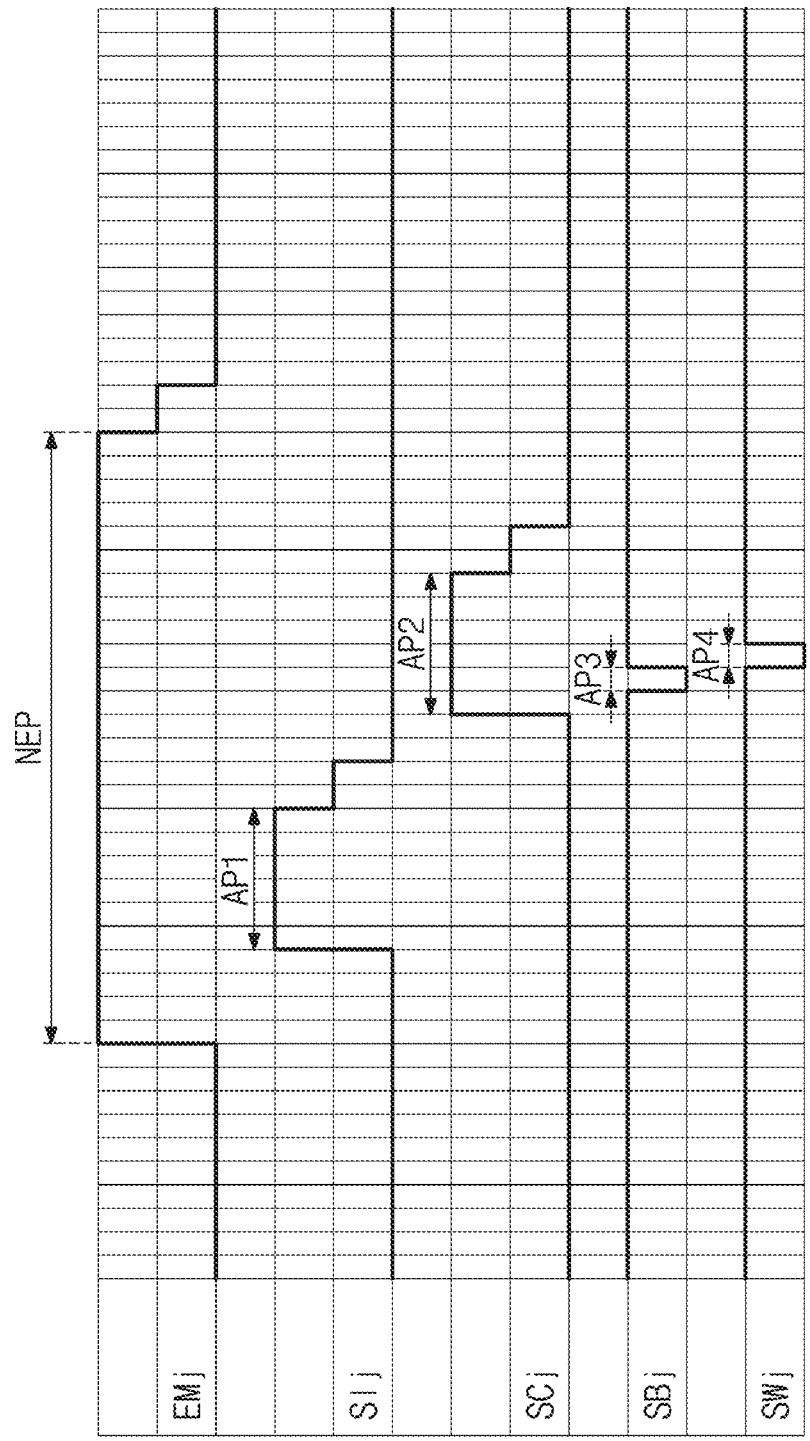
FIG. 5A is a waveform diagram for describing operations of a pixel and a sensor shown in FIG. 4.
Figure 5B:
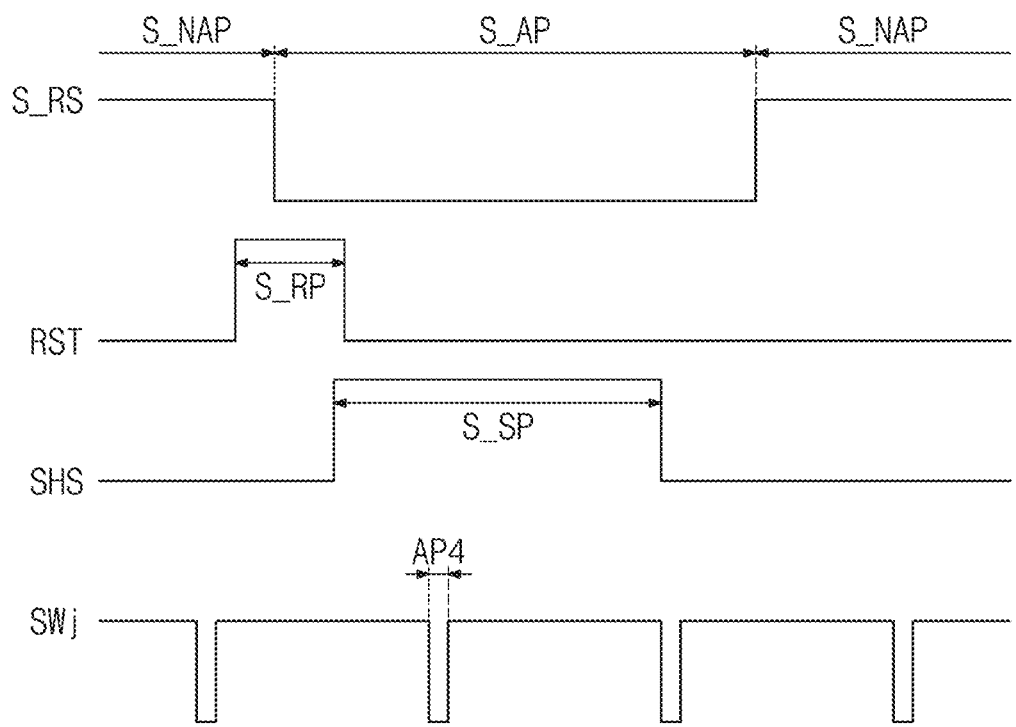
FIG. 5B is a waveform diagram illustrating an operation of the readout circuit shown in FIG. 4.

FIG. 4 is a circuit diagram of a pixel and a sensor, according to an embodiment of the present disclosure. FIG. 5A is a waveform diagram for describing operations of a pixel and a sensor shown in FIG. 4. FIG. 5B is a waveform diagram illustrating an operation of the readout circuit shown in FIG. 4.

FIG. 4 illustrates an equivalent circuit diagram of a single pixel PXij among the pixels PX illustrated in FIG. 3. Because each of the plurality of pixels PX has the same circuit structure, a detailed description of the remaining pixels will be replaced with a description of a circuit structure of the pixel PXij. Moreover, FIG. 4 shows an equivalent circuit diagram of one sensor FXij among the plurality of sensors FX shown in FIG. 3. Because each of the plurality of sensors FX has the same circuit structure, the detailed description of the remaining pixels will be replaced with a description of a circuit structure for the sensor FXij.

Referring to FIG. 4, the pixel PXij is connected with an i-th data line DLi of the data lines DL1 to DLm, a j-th initialization scan line SILj of the initialization scan lines SIL1 to SILn, a j-th compensation scan line SCLj of the compensation scan lines SCL1 to SCLn, a j-th write scan line SWLj of the write scan lines SWL1 to SWLn, a j-th black scan line SBLj of the black scan lines SBL1 to SBLn, and a j-th emission control line EMLj of the emission control lines EML1 to EMLn.

The pixel PXij includes a light emitting element ED and a pixel driving circuit PD. The light emitting element ED may be a light emitting diode. As an example of the present disclosure, the light emitting element ED may be an organic light emitting diode including an organic light emitting layer.

The pixel driving circuit PD includes first to fifth transistors T1, T2, T3, T4, and T5, first and second emission control transistors ET1 and ET2, and a capacitor Cst. At least one of the first to fifth transistors T1, T2, T3, T4, and T5 and the first and second emission control transistors ET1 and ET2 may be a transistor having a low-temperature polycrystalline silicon (LTPS) semiconductor layer. Some of the first to fifth transistors T1, T2, T3, T4, and T5 and the first and second emission control transistors ET1 and ET2 may be P-type transistors, and the others thereof may be N-type transistors. For example, the first, second, and fifth transistors T1, T2, and T5 and the first and second emission control transistors ET1 and ET2 are P-type transistors, and the third and fourth transistors T3 and T4 may be N-type transistors. At least one of the first to fifth transistors T1, T2, T3, T4, and T5 and the first and second emission control transistors ET1 and ET2 may be a transistor having an oxide semiconductor layer. For example, the third and fourth transistors T3 and T4 may be oxide semiconductor transistors, and the first, second, and fifth transistors T1, T2, and T5 and the first and second emission control transistors T1 and T2 may be LTPS transistors.

A configuration of the pixel driving circuit PD according to an embodiment of the present disclosure is not limited to an embodiment illustrated in FIG. 4. The pixel driving circuit PD illustrated in FIG. 4 is only an example. For example, the configuration of the pixel driving circuit PD may be modified and implemented. Each of the first to fifth transistors T1, T2, T3, T4, and T5 and the first and second emission control transistors ET1 and ET2 may be a P-type transistor or an N-type transistor.

The j-th initialization scan line SILj, the j-th compensation scan line SCLj, the j-th write scan line SWLj, the j-th black scan line SBLj, and the j-th emission control line EMLj may transfer a j-th initialization scan signal SIj, a j-th compensation scan signal SCj, a j-th write scan signal SWj, a j-th black scan signal SBj, and a j-th emission control signal EMj to the pixel PXij, respectively. The i-th data line DLi transfers an i-th data signal Di to the pixel PXij. The i-th data signal Di may have a voltage level corresponding to the image signal RGB (see FIG. 3) input to the display device DD (see FIG. 3).

First and second driving voltage lines VL1 and VL2 may transfer the first and second driving voltages ELVDD and ELVSS to the pixel PXij, respectively. Also, first and second initialization voltage lines VL3 and VL4 may transfer the first and second initialization voltages VINT1 and VINT2 to the pixel PXij, respectively.

The first transistor T1 is connected between the first driving voltage line VL1 receiving the first driving voltage ELVDD and the light emitting element ED. The first transistor T1 includes a first electrode (i.e. a source or drain electrode) connected to the first driving voltage line VL1 via the first emission control transistor ET1, a second electrode (i.e. a drain or source electrode) connected to an anode electrode of the light emitting element ED via the second emission control transistor ET2, and a third electrode (i.e. a gate electrode) connected to a first electrode (i.e. a first node N1) of the capacitor Cst. The first transistor T1 may receive the data signal Di transferred through the i-th data line DLi depending on a switching operation of the second transistor T2 and then may supply a driving current Id to the light emitting element ED.

The second transistor T2 is connected between the i-th data line DLi and the first electrode of the first transistor T1. The second transistor T2 includes a first electrode (i.e. a source or drain electrode) connected with the i-th data line DLi, a second electrode (i.e. a drain or source electrode) connected with the first electrode of the first transistor T1, and a third electrode (i.e. a gate electrode) connected with the j-th write scan line SWLj. The second transistor T2 may be turned on in response to the write scan signal SWj transferred through the j-th write scan line SWLj and then may transfer the i-th data signal Di transferred from the i-th data line DLi to the first electrode of the first transistor T1.

The third transistor T3 is connected between the second electrode of the first transistor T1 and the first node N1. The third transistor T3 includes a first electrode (i.e. a source or drain electrode) connected with the third electrode of the first transistor T1, a second electrode (i.e. a drain or source electrode) connected with the second electrode of the first transistor T1, and a third electrode (i.e. a gate electrode) connected with the j-th compensation scan line SCLj. The third transistor T3 may be turned on in response to the j-th compensation scan signal SCj transferred through the j-th compensation scan line SCLj and may connect the third electrode and the second electrode of the first transistor T1. In this case, the first transistor T1 may be diode-connected.

The fourth transistor T4 is connected between the first node N1 and the first initialization voltage line VL3 through which the first initialization voltage VINT1 is applied. The fourth transistor T4 includes a first electrode (i.e. a source or drain electrode) connected to the first initialization voltage line VL3 through which the first initialization voltage VINT1 is supplied, a second electrode (i.e. a drain or source electrode) connected to the first node N1, and a third electrode (i.e. a gate electrode) connected to the j-th initialization scan line SILj. The fourth transistor T4 is turned on in response to the j-th initialization scan signal SIj transferred through the j-th initialization scan line SILj. The fourth transistor T4 thus turned on may transfer the first initialization voltage VINT1 to the first node N1 such that a potential of the third electrode of the first transistor T1 (i.e., a potential of the first node N1) is initialized.

The first emission control transistor ET1 includes a first electrode (i.e. a source or drain electrode) connected with the first driving voltage line VL1, a second electrode (i.e. a drain or source electrode) connected with the first electrode of the first transistor T1, and a third electrode (i.e. a gate electrode) connected with the j-th emission control line EMLj.

The second emission control transistor ET2 includes a first electrode (i.e. a source or drain electrode) connected to the second electrode of the first transistor T1, a second electrode (i.e. a drain or source electrode) connected to the anode electrode of the light emitting element ED, and a third electrode (i.e. a gate electrode) connected to j-th emission control line EMLj.

The first and second emission control transistors ET1 and ET2 are simultaneously turned on in response to the j-th emission control signal EMj transferred through the j-th emission control line EMLj. The first driving voltage ELVDD applied through the first emission control transistor ET1 thus turned on may be compensated through the diode-connected transistor T1 and then may be transferred to the light emitting diode ED.

The fifth transistor T5 includes a first electrode (i.e. a source or drain electrode) connected to the second initialization voltage line VL4 through which the second initialization voltage VINT2 is supplied, a second electrode (i.e. a drain or source electrode) connected to the second electrode of the second emission control transistor ET2, and a third electrode (i.e. a gate electrode) connected to the j-th black scan line SBLj. A voltage level of the second initialization voltage VINT2 may lower than or equal to that of the first initialization voltage VINT1.

The first electrode of the capacitor Cst is connected with the third electrode of the first transistor T1, and a second electrode of the capacitor Cst is connected with the first driving voltage line VL1. A cathode electrode of the light emitting element ED may be connected with the second driving voltage line VL2 that transfers the second driving voltage ELVSS. A voltage level of the second driving voltage ELVSS may be lower than a voltage level of the first driving voltage ELVDD. As an example of the present disclosure, the voltage level of the second driving voltage ELVSS may be lower than the voltage level of each of the first and second initialization voltages VINT1 and VINT2.

Referring to FIGS. 4 and 5A, the j-th emission control signal EMj has a high level during a non-emission period NEP. During the non-emission period NEP, the j-th initialization scan signal SIj is activated. During an activation period AP1 (hereinafter, referred to as a "first activation period") of the j-th initialization scan signal SIj, when the j-th initialization scan signal SIj of a high level is provided through the j-th initialization scan line SILj, the fourth transistor T4 is turned on in response to the j-th initialization scan signal SIj of the high level. The first initialization voltage VINT1 is transferred to the third electrode of the first transistor T1 via the fourth transistor T4 thus turned on, and the first node N1 is initialized to the first initialization voltage VINT1. Accordingly, the first activation period AP1 may be defined as an initialization period of the pixel PXij.

Next, the j-th compensation scan signal SCj is activated, and the third transistor T3 is turned on when the j-th compensation scan signal SCj of the high level is supplied through the j-th compensation scan line SCLj during an activation period AP2 (hereinafter, referred to as a "second activation period") of the j-th compensation scan signal SCj. The first transistor T1 is diode-connected by the third transistor T3 thus turned on to be forward-biased. The first activation period AP1 may not overlap the second activation period AP2.

The j-th write scan signal SWj is activated within the second activation period AP2. The j-th write scan signal SWj has a low level during an activation period AP4 (hereinafter, referred to as a "fourth activation period"). During the fourth activation period AP4, the second transistor T2 is turned on in response to the j-th write scan signal SWj of the low level. In this case, a compensation voltage "Di−Vth" is applied to the third electrode of the first transistor T1. Here, the compensation voltage "Di−Vth" may correspond to a result of subtracting a threshold voltage Vth of the first transistor T1 from a voltage of the i-th data signal Di supplied from the i-th data line DLi. That is, a potential of the third electrode of the first transistor T1 may be the compensation voltage "Di−Vth". The fourth activation period AP4 may overlap the second activation period AP2. The duration of the second activation period AP2 may be greater than the duration of the fourth activation period AP4.

The first driving voltage ELVDD and the compensation voltage "Di−Vth" may be respectively applied to opposite electrodes of the capacitor Cst, and charges corresponding to a voltage difference between the opposite electrodes of the capacitor Cst may be stored in the capacitor Cst. Herein, a high level period of the j-th compensation scan signal SCj may be referred to as a "compensation period" of the pixel PXij.

In the meantime, the j-th black scan signal SBj is activated within the second activation period AP2 of the j-th compensation scan signal SCj. The j-th black scan signal SBj has a low level during the activation period AP3 (hereinafter, referred to as a "third activation period"). During the third activation period AP3, the fifth transistor T5 is turned on by receiving the j-th black scan signal SBj of a low level through the j-th black scan line SBLj. A portion of the driving current Id may be drained through the fifth transistor T5 as a bypass current Ibp. The third activation period AP3 may overlap the second activation period AP2. The duration of the second activation period AP2 may be greater than the duration of the third activation period AP3. The third activation period AP3 may precede the fourth activation period AP4, and may not overlap the fourth activation period AP4.

In the case where the pixel PXij displays a black image, when the light emitting element ED emits light even though the minimum driving current of the first transistor T1 flows as the driving current Id, the pixel PXij may not normally display a black image. Accordingly, the fifth transistor T5 in the pixel PXij according to an embodiment of the present disclosure may drain (or disperse) a part of the minimum driving current of the first transistor T1 to a current path, which is different from a current path to the light emitting element ED, as the bypass current Ibp. Here, the minimum driving current of the first transistor T1 means the current flowing into the first transistor T1 under the condition that the first transistor T1 is turned off because the gate-source voltage Vgs of the first transistor T1 is less than the threshold voltage Vth. As the minimum driving current (e.g., a current of 10 pA or less) flowing to the first transistor T1 is transferred to the light emitting element ED under the condition that the first transistor T1 is turned off, an image of a black gray scale is displayed. When the pixel PXij displays a black image, the bypass current Ibp has a relatively large influence on the minimum driving current. On the other hand, when the pixel PXij displays an image such as a normal image or a white image, the bypass current Ibp has little effect on the driving current Id. Accordingly, when a black image is displayed, a current (i.e., the light emitting current Ied) that corresponds to a result of subtracting the bypass current Ibp flowing through the fifth transistor T5 from the driving current Id is provided to the light emitting element ED, and thus a black image may be clearly displayed. Accordingly, the pixel PXij may implement an accurate black grayscale image by using the fifth transistor T5, thereby improving a contrast ratio.

Next, the j-th emission control signal EMj that is supplied from the j-th emission control line EMLj transitions from the high level to the low level. The first and second emission control transistors ET1 and ET2 are turned on by the emission control signal EMj of the low level. In this case, because a difference is present between the voltage of the third electrode of the first transistor T1 and the first driving voltage ELVDD, the driving current Id is generated. The driving current Id thus generated is supplied to the light emitting element ED through the second emission control transistor ET2, and thus, a current Ied flows through the light emitting element ED.

Returning to FIG. 4, the sensor FXij is connected to the d-th readout line RLd among the readout lines RL1 to RLh, the j-th write scan line SWLj, and a reset control line RCL.

The sensor FXij includes at least one light receiving element OPD and a sensor driving circuit O_SD. FIG. 4 shows that the sensor FXij includes the one light receiving element OPD, but the present disclosure is not limited thereto. For example, the sensor FXij may include two or more light receiving elements OPD and two or more light receiving elements may be connected in parallel with each other. The light receiving element OPD may be a photodiode. As an example of the present disclosure, the light receiving element OPD may be an organic photodiode including an organic material as a photoelectric conversion layer.

An anode electrode of the light receiving element OPD may be connected to a first sensing node SN1. A cathode electrode of the light receiving element OPD may be connected to the second driving voltage line VL2 that delivers the second driving voltage ELVSS. The cathode electrode of the light receiving element OPD may be electrically connected to the cathode electrode of the light emitting element ED. As an example of the present disclosure, the cathode electrode of the light receiving element OPD may be integrated with the cathode electrode of the light emitting element ED to form a common cathode electrode C_CE (see FIG. 6).

The sensor driving circuit O_SD includes three transistors ST1, ST2, and ST3. The three transistors ST1 to ST3 may include a reset transistor ST1, an amplification transistor ST2, and an output transistor ST3. At least one of the reset transistor ST1, the amplification transistor ST2, and the output transistor ST3 may be an oxide semiconductor transistor. As an example of the present disclosure, the reset transistor ST1 may be an oxide semiconductor transistor, and the amplification transistor ST2 and the output transistor ST3 may be LTPS (low-temperature polycrystalline silicon) transistors. However, the present disclosure is not limited thereto. The reset transistor ST1 and the output transistor ST3 may be oxide semiconductor transistors, and the amplification transistor ST2 may be an LTPS transistor.

Also, some of the reset transistor ST1, the amplification transistor ST2, and the output transistor ST3 may be P-type transistors, and the other(s) thereof may be an N-type transistor. As an example of the present disclosure, the amplification transistor ST2 and the output transistor ST3 may be PMOS transistors, and the reset transistor ST1 may be an NMOS transistor. However, the present disclosure is not limited thereto. For example, all the transistors ST1, ST2, and ST3 may be N-type transistors or P-type transistors.

Some (e.g., the reset transistor ST1) of the reset transistor ST1, the amplification transistor ST2, and the output transistor ST3 may be implemented with a transistor having the same type as each of the third and fourth transistors T3 and T4 of the pixel PXij. The type of each of the amplification transistor ST2 and the output transistor ST3 may be the same as that of each of the first, second, and fifth transistors T1, T2, and T5 and the first and second emission control transistors ET1 and ET2 of the pixel PXij.

The circuit configuration of the sensor driving circuit O_SD according to the present disclosure is not limited to that illustrated in FIG. 4. The sensor driving circuit O_SD illustrated in FIG. 4 is only an example, and the configuration of the sensor driving circuit O_SD may be modified and implemented.

The reset transistor ST1 includes a first electrode (i.e. a source or drain electrode) receiving a reset voltage Vrst, a second electrode (i.e. a drain or source electrode) connected to the first sensing node SN1, and a third electrode (i.e. a gate electrode) receiving a reset control signal RST. The reset transistor ST1 may reset a potential of the first sensing node SN1 to the reset voltage Vrst in response to the reset control signal RST. The reset control signal RST may be a signal provided through the reset control line RCL. However, the present disclosure is not limited thereto. Alternatively, the reset control signal RST may be the j-th compensation scan signal SCj supplied through the j-th compensation scan line SCLj. That is, the reset transistor ST1 may receive the j-th compensation scan signal SCj, which is supplied through the j-th compensation scan line SCLj, as the reset control signal RST. As an example of the present disclosure, during the at least activation period of the reset control signal RST, the reset voltage Vrst may have a voltage level lower than the second driving voltage ELVSS. The reset voltage Vrst may be a DC (direct current) voltage maintained at a voltage level lower than the second driving voltage ELVSS.

The reset transistor ST1 may include a plurality of sub-reset transistors connected to one another in series. For example, the reset transistor ST1 may include two sub-reset transistors (hereinafter referred to as "first and second sub-reset transistors"). In this case, a third electrode of the first sub reset transistor and a third electrode of the second sub reset transistor are connected with the reset control line RCL. Also, a second electrode of the first sub-reset transistor and a first electrode of the second sub-reset transistor may be electrically connected with each other. Also, the reset voltage Vrst may be applied to a first electrode of the first sub reset transistor, and a second electrode of the second sub reset transistor may be electrically connected with the first sensing node SN1. However, the number of sub-reset transistors is not limited thereto and may be variously changed or modified.

The amplification transistor ST2 includes a first electrode (i.e. a source or drain electrode) receiving a sensing driving voltage SLVD, a second electrode (i.e. a drain or source electrode) connected with the second sensing node SN2, and a third electrode (i.e. a gate electrode) connected with the first sensing node SN1. The amplification transistor ST2 is turned on in response to the potential of the first sensing node SN1 to apply the sensing driving voltage SLVD to the second sensing node SN2. As an example of the present disclosure, the sensing driving voltage SLVD may correspond to one of the first driving voltage ELVDD, the first initialization voltage VINT1, and the second initialization voltage VINT2. When the sensing driving voltage SLVD corresponds to the first driving voltage ELVDD, the first electrode of the amplification transistor ST2 may be electrically connected with the first driving voltage line VL1. When the sensing driving voltage SLVD corresponds to the first initialization voltage VINT1, the first electrode of the amplification transistor ST2 may be electrically connected with the first initialization voltage line VL3. When the sensing driving voltage SLVD corresponds to the second initialization voltage VINT2, the first electrode of the amplification transistor ST2 may be electrically connected with the second initialization voltage line VL4.

The output transistor ST3 includes a first electrode (i.e. a source or drain electrode) connected to the second sensing node SN2, a second electrode (i.e. a drain or source electrode) connected to the d-th readout line RLd, and a third electrode (i.e. a gate electrode) receiving an output control signal. The output transistor ST3 may deliver a sensing signal FSd to the d-th readout line RLd in response to the output control signal. The output control signal may be the j-th write scan signal SWj supplied through the j-th write scan line SWLj. That is, the output transistor ST3 may receive the j-th write scan signal SWj supplied from the j-th write scan line SWLj as the output control signal.

The light receiving element OPD of the sensor FXij may be exposed to light during the emission period of the light emitting element ED. The light may be output from the light emitting element ED.

In a mode of sensing a user's information (e.g., the user's fingerprint), when a user's hand US_F (see FIG. 1) touches a display surface, the light receiving element OPD generates photocharges corresponding to light reflected by a ridge or valley between ridges of a fingerprint. The amount of current flowing through the light receiving element OPD is changed by the generated photocharges. When the light receiving element OPD receives the light reflected by the ridge of the fingerprint, the current flowing through the light receiving element OPD may be referred to as a "first current". When the light receiving element OPD receives the light reflected by the valley of the fingerprint, the current flowing through the light receiving element OPD may be referred to as a "second current". Because there is a difference in light intensity between light reflected by the fingerprint's ridge and light reflected by the fingerprint's valley, the difference in light intensity is a difference between the first and second currents. When the first current flows through the light receiving element OPD, a potential of the first sensing node SN1 may be referred to as a "first potential". When the second current flows through the light receiving element OPD, a potential of the first sensing node SN1 may be referred to as a "second potential". As an example of the present disclosure, the first current may be greater than the second current. In this case, the first potential may be lower than the second potential.

The amplification transistor ST2 may be a source follower amplifier generating a source-drain current in proportion to the potential of the first sensing node SN1 input to the third electrode of the amplification transistor ST2.

During the fourth activation period AP4, the j-th write scan signal SWj of a low level is supplied to the output transistor ST3 through the j-th write scan line SWLj. When the output transistor ST3 is turned on in response to the j-th write scan signal SWj of the low level, the sensing signal FSd corresponding to a current flowing through the amplification transistor ST2 may be output to the d-th readout line RLd.

Next, when the reset control signal RST of a high level is supplied through the reset control line RCL during the next node reset period, the reset transistor ST1 is turned on. The node reset period may be defined as an activation period (i.e., a high-level period) of the reset control line RCL. Alternatively, when the reset transistor ST1 is a PMOS transistor, the reset control signal RST of a low level may be supplied to the reset control line RCL during the node reset period. During the node reset period, a potential of the first sensing node SN1 may be reset to a potential corresponding to the reset voltage Vrst. As an example of the present disclosure, the reset voltage Vrst may have a lower voltage level than the second driving voltage ELVSS.

Next, when the node reset period ends, the light receiving element OPD may generate photocharges corresponding to the received light, and the generated photocharges may be accumulated in the first sensing node SN1.

Referring to FIGS. 3, 4, and 5B, the readout circuit 500 is deactivated in response to a deactivation period S_NAP of a system reset signal S_RS, and is activated in response to an activation period S_AP (hereinafter referred to as a "system activation period") of the system reset signal S_RS. During the system activation period S_AP, the readout circuit 500 is activated to process sensing signals output from readout lines RL1 to RLh.

The system activation period S_AP may overlap a reset period S_RP and a sampling period S_SP. During the reset period S_RP, the readout circuit 500 may reset the readout lines RL1 to RLh in response to the reset control signal RST.

During the sampling period S_SP, the readout circuit 500 may receive sensing signals from the readout lines RL1 to RLh in response to a sampling signal SHS from the first sensing node SN1, which activates the gate electrode of the amplification transistor ST2. As an example of the present disclosure, during the sampling period S_SP, each of the sensors FX may output a sensing signal through a corresponding readout line among the readout lines RL1 to RLh in response to an output control signal. FIG. 5B shows that the j-th row of sensors among the sensors FX receives the j-th write scan signal SWj as an output control signal, but the present disclosure is not limited thereto. The activation period AP4 of the j-th write scan signal SWj may be located within the sampling period S_SP.

Figure 6:
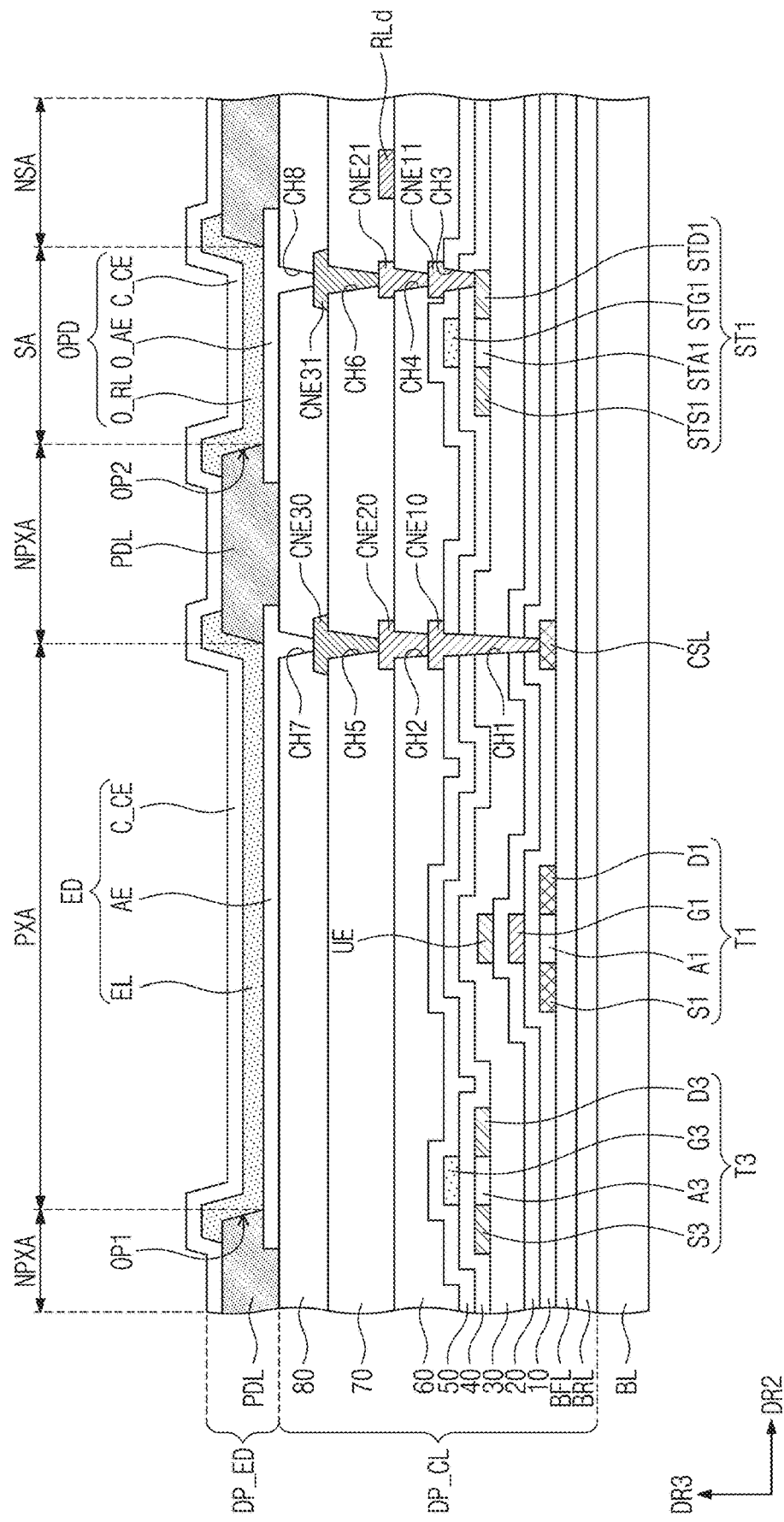
FIG. 6 is a cross-sectional view of a display panel, according to an embodiment of the present disclosure.

FIG. 6 is a cross-sectional view illustrating a pixel and a sensor of a display panel, according to an embodiment of the present disclosure.

Referring to FIG. 6, the display panel DP includes a base layer BL, a circuit layer DP_CL, and an element layer DP_ED.

The base layer BL may include a synthetic resin layer. The synthetic resin layer may include a thermosetting resin. In detail, the synthetic resin layer may be a polyimide-based resin layer, and the material thereof is not particularly limited thereto. The synthetic resin layer may include at least one of acrylate-based resin, methacrylate-based resin, polyisoprene, vinyl-based resin, epoxy-based resin, urethane-based resin, cellulose-based resin, siloxane-based resin, polyamide-based resin, and perylene-based resin. In addition, the base layer BL may include a glass substrate, a metal substrate, or an organic/inorganic composite substrate.

At least one inorganic layer is formed on an upper surface of the base layer BL. The inorganic layer may include at least one of aluminum oxide, titanium oxide, silicon oxide, silicon oxynitride, zirconium oxide, and hafnium oxide. The inorganic layer may be formed of multiple layers. For example, the multi-layered inorganic layers may include a barrier layer BRL and a buffer layer BFL, which will be described later. The barrier layer BRL and the buffer layer BFL may be disposed selectively.

The circuit layer DP_CL may include the barrier layer BRL or the buffer layer BFL. The barrier layer BRL prevents foreign objects from being introduced from the outside. The barrier layer BRL may include a silicon oxide layer and a silicon nitride layer. Each of the silicon oxide layer and the silicon nitride layer may include a plurality of layers, and the plurality of silicon oxide layers and the silicon nitride layers may be alternately stacked.

The buffer layer BFL may be disposed on the barrier layer BRL. The buffer layer BFL improves a bonding force between the base layer BL and the semiconductor pattern or the conductive pattern. The buffer layer BFL may include a silicon oxide layer and a silicon nitride layer. The silicon oxide layer and the silicon nitride layer may be alternately stacked.

The semiconductor pattern is disposed on the buffer layer BFL. Hereinafter, the semiconductor pattern directly disposed on the buffer layer BFL is defined as a first semiconductor pattern. The first semiconductor pattern may include a silicon semiconductor. The first semiconductor pattern may include polysilicon. However, an embodiment is not limited thereto. For example, the first semiconductor pattern may include amorphous silicon.

FIG. 6 only illustrates a part of the first semiconductor pattern. The first semiconductor pattern may be further disposed in another area of the pixel PXij (see FIG. 4). The first semiconductor pattern has different electrical characteristics depending on whether the first semiconductor pattern is doped. The first semiconductor pattern may include a doped area and an undoped area. The doped area may be doped with an N-type dopant or a P-type dopant. A P-type transistor includes a doped area doped with the P-type dopant, and an N-type transistor includes a doped area doped with the N-type dopant.

The doped area has higher conductivity than the undoped area, and substantially operates as an electrode or signal line. The undoped area substantially corresponds to the active area (or channel) of a transistor. In other words, a part of the first semiconductor pattern may be an active area of a transistor. Another part thereof may be a source or drain of the transistor. Another part thereof may be a connection signal line (or a connection electrode).

As illustrated in FIG. 6, a first electrode S1, a channel part A1, and a second electrode D1 of the first transistor T1 are formed from the first semiconductor pattern. The first electrode S1 and the second electrode D1 of the first transistor T1 extend in opposite directions from the channel part A1.

A portion of a connection signal line CSL formed from the semiconductor pattern is illustrated in FIG. 6. Although not separately shown, the connection signal line CSL may be connected to the second electrode of the second emission control transistor ET2 (see FIG. 4) on a plane.

A first insulating layer 10 is disposed on the buffer layer BFL. The first insulating layer 10 overlaps the plurality of pixels PX (see FIG. 3) in common so as to cover the first semiconductor pattern. The first insulating layer 10 may be an inorganic layer or an organic layer, and may have a single layer or multi-layer structure. The first insulating layer 10 may include at least one of an aluminum oxide, a titanium oxide, a silicon oxide, a silicon oxynitride, a zirconium oxide, and a hafnium oxide. In an embodiment, the first insulating layer 10 may be a silicon oxide layer having a single layer structure. An insulating layer of the circuit layer DP_CL, which is to be described later, as well as the first insulating layer 10 may be an inorganic layer or an organic layer, and may have a single layer structure or a multi-layer structure. The inorganic layer may include at least one of the materials described above.

A third electrode G1 of the first transistor T1 is disposed on the first insulating layer 10. The third electrode G1 may be a portion of a metal pattern. The third electrode G1 of the first transistor T1 overlaps the channel part A1 of the first transistor T1. In a process of doping the first semiconductor pattern, the third electrode G1 of the first transistor T1 may serve as a mask.

A second insulating layer 20 covering the third electrode G1 is disposed on the first insulating layer 10. The second insulating layer 20 overlaps a plurality of pixels PX in common. The second insulating layer 20 may be an inorganic layer or an organic layer, and may have a single layer structure or a multi-layer structure. In an embodiment, the second insulating layer 20 may be a silicon oxide layer having a single layer structure.

An upper electrode UE may be disposed on the second insulating layer 20. The upper electrode UE may overlap the third electrode G1. The upper electrode UE may be a portion of a metal pattern or a portion of a doped semiconductor pattern. A portion of the third electrode G1 and the upper electrode UE overlapping the portion of the third electrode G1 may define a capacitor Cst (see FIG. 4). In an embodiment of the present disclosure, the upper electrode UE may be omitted.

In an embodiment of the present disclosure, the second insulating layer 20 may be replaced with an insulating pattern. The upper electrode UE is arranged on the insulating pattern. The upper electrode UE may serve as a mask for forming an insulating pattern from the second insulating layer 20.

A third insulating layer 30 covering the upper electrode UE is disposed on the second insulating layer 20. In an embodiment, the third insulating layer 30 may be a silicon oxide layer having a single layer structure. A semiconductor pattern is arranged on the third insulating layer 30. Hereinafter, the semiconductor pattern directly disposed on the third insulating layer 30 is defined as a second semiconductor pattern. The second semiconductor pattern may include metal oxide. The oxide semiconductor may include a crystalline or amorphous oxide semiconductor. For example, the oxide semiconductor may include oxides of metals (e.g., zinc (Zn), indium (In), gallium (Ga), tin (Sn), titanium (Ti), and the like) or a mixture of the metals (e.g., zinc (Zn), indium (In), gallium (Ga), tin (Sn), titanium (Ti), and the like) and oxides of the metals. The oxide semiconductors may include indium-tin oxide (ITO), indium-gallium-zinc oxide (IGZO), zinc oxide (ZnO), indium-zinc oxide (IZO), zinc-indium oxide (ZIO), indium oxide (InO), titanium oxide (TiO), indium-zinc-tin oxide (IZTO), zinc-tin oxide (ZTO), and the like.

FIG. 6 shows only a part of the second semiconductor pattern. For example, the second semiconductor pattern may be further disposed in another area of the pixel PXij. The second semiconductor pattern may include a plurality of areas identified depending on whether the metal oxide is reduced. An area (hereinafter referred to as a "reduction area") in which the metal oxide is reduced has higher conductivity than an area (hereinafter referred to as a "non-reduction area") in which the metal oxide is not reduced. The reduction area substantially has a role of an electrode or signal line. The non-reduction area substantially corresponds to a channel part of a transistor. In other words, the portion of the second semiconductor pattern may be a channel part of a transistor, and another portion thereof may be a first electrode or a second electrode of the transistor.

As illustrated in FIG. 6, a first electrode S3, a channel part A3, and a second electrode D3 of the third transistor T3 are formed from the second semiconductor pattern.

The second semiconductor pattern may further include a portion of a semiconductor pattern of the sensor driving circuit O_SD (see FIG. 4). For convenience of description, the reset transistor ST1 is shown in the semiconductor patterns of the sensor driving circuit O_SD. A first electrode STS1, a channel part STA1, and a second electrode STD1 of the reset transistor ST1 are formed from the second semiconductor pattern. As an example of the present disclosure, the second semiconductor pattern may include metal oxide. The first electrode STS1 and the second electrode STD1 include a metal reduced from a metal oxide semiconductor. The first electrode STS1 and the second electrode STD1 may have a given thickness from an upper surface of the second semiconductor pattern and may include a metal layer including the reduced metal.

A fourth insulating layer 40 is disposed to cover the first electrode STS1, the channel part STA1, and the second electrode STD1 of the reset transistor ST1. A third electrode STG1 of the reset transistor ST1 is disposed on the fourth insulating layer 40. In an embodiment, the third electrode STG1 may be a part of the metal pattern. The third electrode STG1 of the reset transistor ST1 overlaps the channel part STA1 of the reset transistor ST1. In an embodiment, for convenience of description, the one third electrode STG1 is illustrated, but the reset transistor ST1 may include two third electrodes.

A third electrode G3 of the third transistor T3 is disposed on the fourth insulating layer 40. The third electrode G3 may be a part of the metal pattern. The third electrode G3 of the third transistor T3 overlaps the channel part A3 of the third transistor T3.

A fifth insulating layer 50 covering the third electrode STG1 and the third electrode G3 is disposed on the fourth insulating layer 40. In an embodiment, the fifth insulating layer 50 may include a silicon oxide layer and a silicon nitride layer. The fifth insulating layer 50 may include a plurality of silicon oxide layers and a plurality of silicon nitride layers, which are alternately stacked.

At least one insulating layer is further disposed on the fifth insulating layer 50. In an embodiment, a sixth insulating layer 60, a seventh insulating layer 70 and an eighth insulating layer 80 may be disposed on the fifth insulating layer 50. The sixth insulating layer 60, the seventh insulating layer 70 and the eighth insulating layer 80 may be organic layers, and may have a single layer or multi-layer structure. The sixth insulating layer 60, the seventh insulating layer 70 and the eighth insulating layer 80 may be a polyimide-based resin layer having a single layer structure. However, the present disclosure is not limited thereto. For example, the sixth insulating layer 60, the seventh insulating layer 70, and the eighth insulating layer 80 may include at least one of acrylate-based resin, methacrylate-based resin, polyisoprene, vinyl-based resin, epoxy-based resin, urethane-based resin, cellulose-based resin, siloxane-based resin, polyamide-based resin, and perylene-based resin.

A first connection electrode CNE10 may be disposed on the fifth insulating layer 50. The first connection electrode CNE10 may be connected with the connection signal line CSL through a first contact hole CH1 penetrating the first to fifth insulating layers 10 to 50, and a second connection electrode CNE20 may be connected with the first connection electrode CNE10 through a second contact hole CH2 penetrating the sixth insulating layer 60. In an embodiment of the present disclosure, at least one of the fifth to seventh insulating layers 50 to 70 may be omitted, and one of the first and second connection electrodes CNE10 and CNE20 may be also omitted.

A third connection electrode CNE11 may be further disposed on the fifth insulating layer 50. The third connection electrode CNE11 may be connected to the third electrode STD1 of the reset transistor ST1 through a third contact hole CH3 penetrating the fourth and fifth insulating layers 40 and 50, and a fourth connection electrode CNE21 may be connected to the third connection electrode CNE11 through a fourth contact hole CH4 penetrating the sixth insulating layer 60.

The i-th data line DLi (see FIG. 4) and the d-th readout line RLd may be disposed on the same layer (i.e., the sixth insulating layer 60) as the second and fourth connection electrodes CNE20 and CNE21. However, the present disclosure is not limited thereto. Alternatively, the i-th data line DLi (see FIG. 4) and the d-th readout line RLd may be disposed on the same layer(i.e., the fifth insulating layer 50) as the first and third connection electrodes CNE10 and CNE11. The second and fourth connection electrodes CNE20 and CNE21, the i-th data line DLi, and the d-th readout line RLd are covered by the seventh insulating layer 70.

A first dummy connection electrode CNE30 and a second dummy connection electrode CNE31 may be further disposed on the seventh insulating layer 70. The first dummy connection electrode CNE30 may be electrically connected to the second connection electrode CNE20 through a fifth contact hole CH5 passing through the seventh insulating layer 70. The second dummy connection electrode CNE31 may be electrically connected to the fourth connection electrode CNE21 through a sixth contact hole CH6 passing through the seventh insulating layer 70.

The element layer DP_ED is disposed on the circuit layer DP_CL. The element layer DP_ED may include an anode electrode AE of the light emitting element ED and an anode electrode O_AE of the light receiving element OPD. As shown in FIG. 6, the anode electrode AE of the light emitting element ED may be connected to the first dummy connection electrode CNE30 through a seventh contact hole CH7 penetrating the eighth insulating layer 80. The anode electrode O_AE of the light receiving element OPD may be connected to the second dummy connection electrode CNE31 through an eighth contact hole CH8 penetrating the eighth insulating layer 80.

FIG. 6 illustrates a structure in which the circuit layer DP_CL includes the first dummy connection electrode CNE30 and the second dummy connection electrode CNE31, but the present disclosure is not limited thereto. Alternatively, the first dummy connection electrode CNE30 and the second dummy connection electrode CNE31 may be omitted from the circuit layer. In this case, the anode electrode AE of the light emitting element ED may be directly connected to the second connection electrode CNE20, and the anode electrode O_AE of the light receiving element OPD may be directly connected to the fourth connection electrode CNE21.

The element layer DP_ED further includes a pixel defining layer PDL disposed on the circuit layer DP_CL. The pixel defining layer PDL may include a light emitting opening OP1 defined to correspond to the light emitting element ED and a light receiving opening OP2 defined to correspond to the light receiving element OPD. At least part of the anode electrode AE of the light emitting element ED is exposed. The light emitting opening OP1 of the pixel defining layer PDL may define an emission area PXA. For example, the plurality of pixels PX (see FIG. 3) may be arranged on a plane of the display panel DP (see FIG. 3) depending on a specific rule. An area in which the plurality of pixels PX are disposed may be defined as a pixel area. One pixel area may include the emission area PXA and a non-emission area NPXA adjacent to the emission area PXA. The non-emission area NPXA may surround the emission area PXA.

The light receiving opening OP2 exposes the anode electrode O_AE of the light receiving element OPD. The light receiving opening OP2 of the pixel defining layer PDL may define a light receiving area SA. For example, the plurality of sensors FX (see FIG. 3) may be arranged on a plane of the display panel DP depending on a specific rule. An area in which the plurality of sensors FX are arranged may be defined as a sensing area, and one sensing area may include the light receiving area SA and a non-receiving area NSA adjacent to the light receiving area SA. The non-receiving area NSA may surround the light receiving area SA.

The light emitting layer EL is disposed to correspond to the light emitting opening OP1 defined in the pixel defining layer PDL, and the photoelectric conversion layer O_RL is provided to correspond to the light receiving opening OP2 defined in the pixel defining layer PDL. In an embodiment, the patterned light emitting layer EL is illustrated, but the present disclosure is not limited thereto. A common light emitting layer may be disposed on the plurality of pixels PX in common. In this case, the common light emitting layer may generate white light or blue light. The common cathode electrode C_CE is connected to the light emitting element ED and the light receiving element OPD in common. The common cathode electrode C_CE may face the anode electrode O_AE of the light receiving element OPD and the anode electrode E_AE of the light emitting element ED. The common cathode electrode C_CE is disposed on the light emitting layer EL and the photoelectric conversion layer O_RL. The common cathode electrode C_CE is disposed in the plurality of pixels PX and the plurality of sensors FX in common.

Figure 7A:
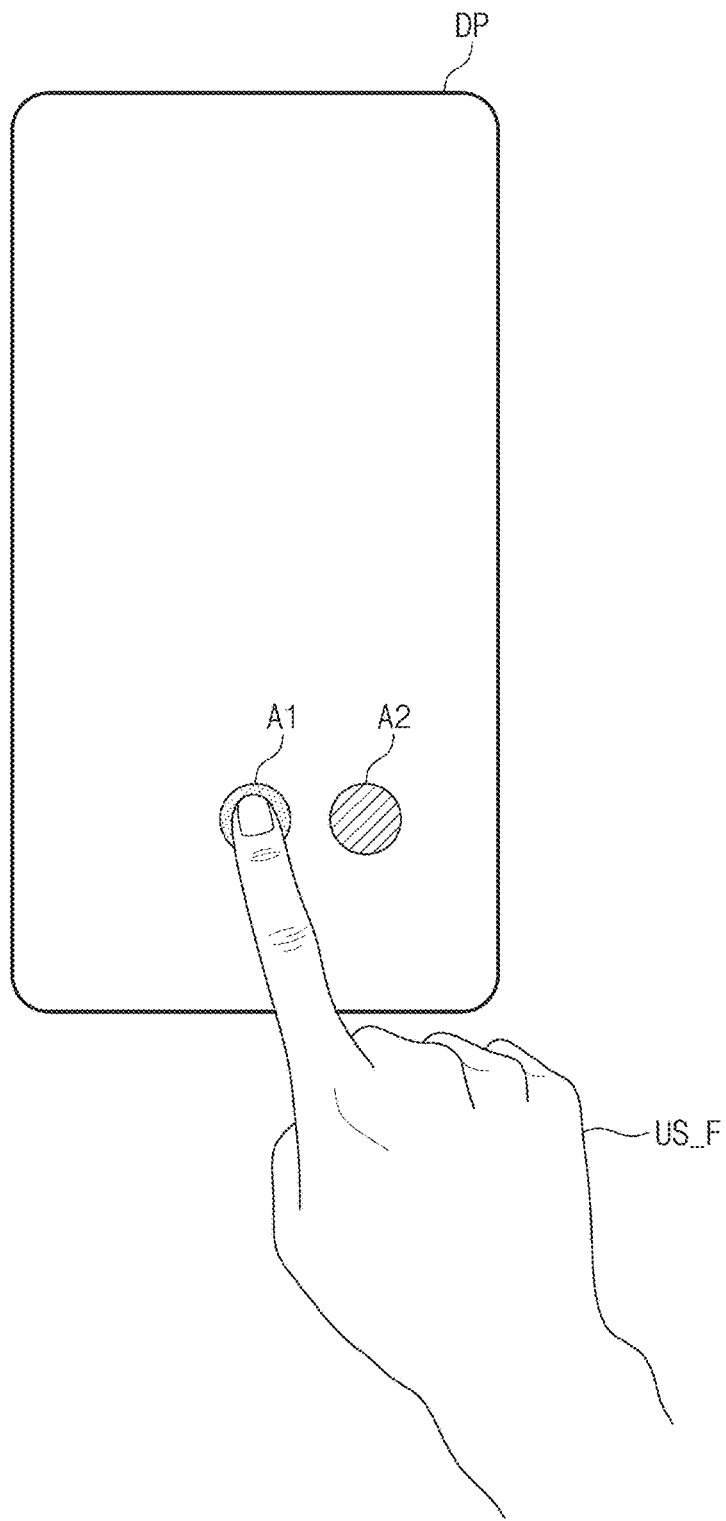
FIG. 7A is a diagram showing first and second areas of a display panel, according to an embodiment of the present disclosure.
Figure 7B:
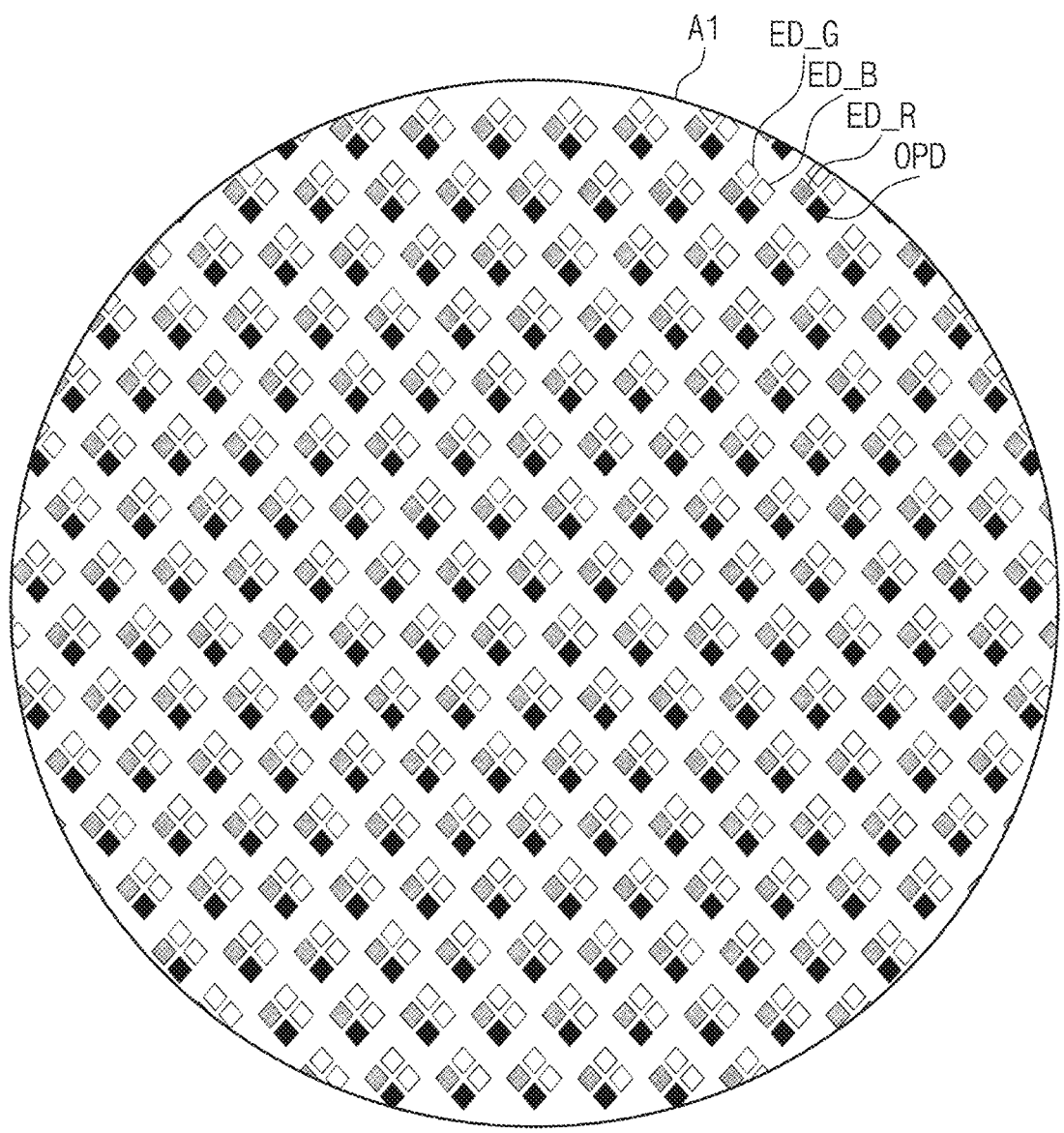
FIGS. 7B and 7C are diagrams for describing a sensing operation of a display panel in a first area shown in FIG. 7A.
Figure 7C:
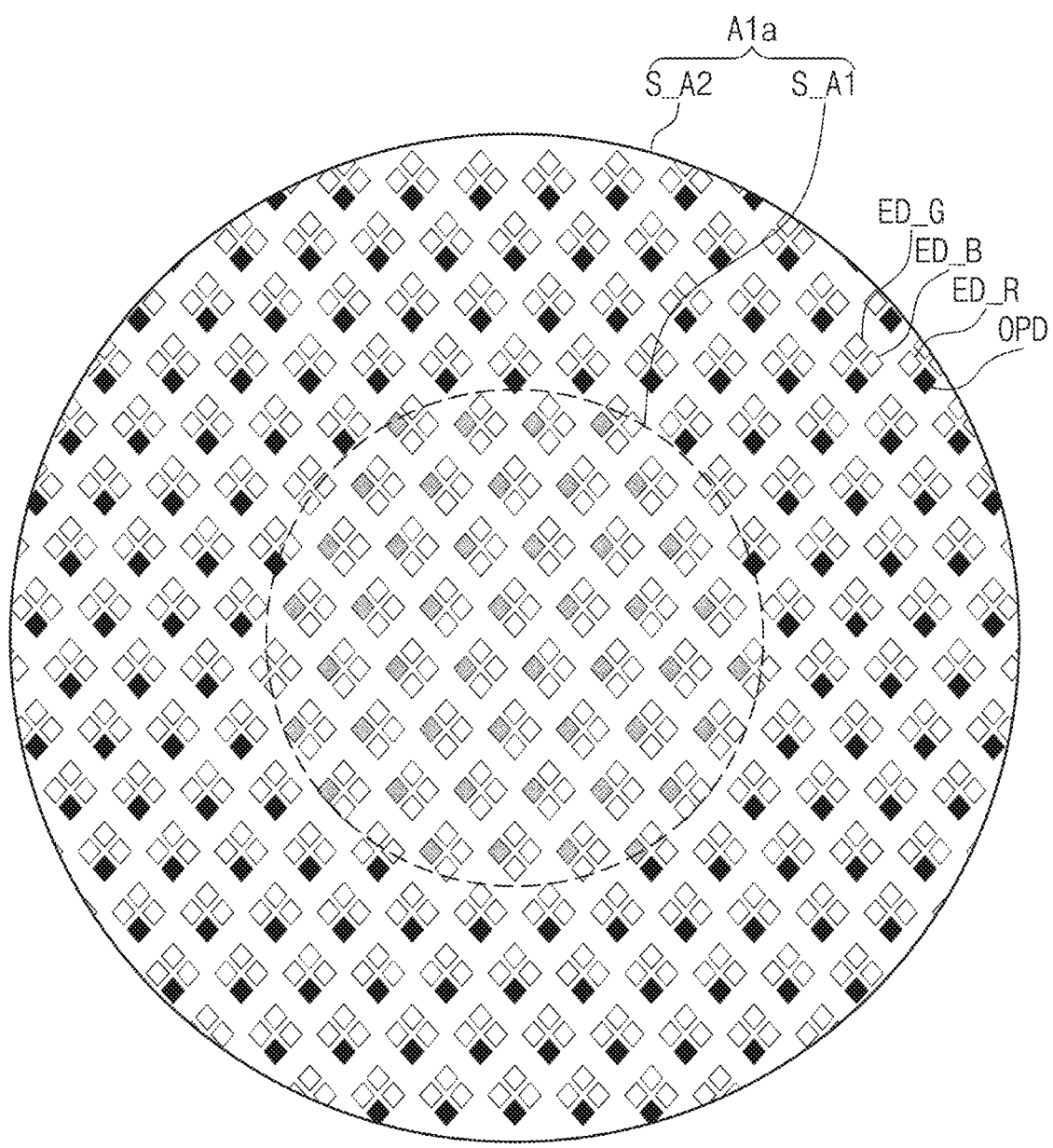

FIG. 7A is a diagram showing first and second areas of a display panel, according to an embodiment of the present disclosure. FIGS. 7B and 7C are diagrams for describing a sensing operation of a display panel in a first area shown in FIG. 7A.

Referring to FIG. 7A, the display panel DP includes a first area A1 for sensing user information and a second area A2 adjacent to the first area A1. The first area A1 may be an effective sensing area for sensing user information, and the second area A2 may be a noise sensing area for sensing noise. As an example of the present disclosure, the sensors FX (see FIG. 3) may be positioned entirely in the display area DA (see FIG. 3) of the display panel DP, and thus the entire display area DA may sense the user information. However, when a user launches a specific application for entering information, the sensors FX may be activated to sense information of the user in a partial area (i.e., a first area) of the display panel DP. The application may be an application requiring security authentication or an application for measuring the user's health information. Security authentication information may be a fingerprint, an iris, or a face, and the user's health information may be blood pressure or pulse wave.

The second area A2 may be defined from the remaining areas, which exclude the first area A1, from among the display area DA of the display panel DP. As an example of the present disclosure, the second area A2 may be defined as an area, which is spaced from the first area A1 in the display area DA and does not overlap the user's body portion US_F contacting the first area A1. As an example of the present disclosure, the first area A1 may have a circular or elliptical shape, and the second area A2 may have a shape and size the same as the first area A1. However, the shapes of the first and second areas A1 and A2 are not particularly limited thereto and may have a rectangular shape or the like. As an example of the present disclosure, the first and second areas A1 and A2 may be predetermined areas.

As shown in FIGS. 7B and 7C, a plurality of pixel cells may be repeatedly arranged in the first area A1 in the first and second directions DR1 and DR2. Each pixel cell includes a first pixel (or a red pixel), a second pixel (or a green pixel), and a third pixel (or a blue pixel). A sensor may be positioned adjacent to each pixel cell.

The first pixel includes a first light emitting element (or a red light emitting element) ED_R emitting first color light (or red light); the second pixel includes a second light emitting element (or a green light emitting element) ED_G emitting second color light (or green light); and, the third pixel includes a third light emitting element (or a blue light emitting element) ED_B emitting third color light (or blue light). The sensor may include a light receiving element OPD that receives one of first to third color light.

As an example of the present disclosure, each of the first to third light emitting elements ED_R, ED_G, and ED_B may have a rhombic shape in the first and second directions DR1 and DR2. However, shapes of the first to third light emitting elements ED_R, ED_G, and ED_B are not limited thereto and may be varied in various manners. For example, each of the first to third light emitting elements ED_R, ED_G, and ED_B may have a circular shape, a rectangular shape, or an octagonal shape.

As an example of the present disclosure, identically to the shape of each of the first to third light emitting elements ED_R, ED_G, and ED_B, the light receiving element OPD may have a rhombic shape. However, the shape of the light receiving element is not limited thereto. For example, the light receiving element OPD may have a shape the same as or different from at least one of the first to third light emitting elements ED_R, ED_G, and ED_B. The light receiving element OPD may have a circular shape, a rectangular shape, or an octagonal shape. The light receiving element OPD may have a shape smaller than or equal to at least one of the first to third light emitting elements ED_R, ED_G, and ED_B.

As shown in FIG. 7B, when a fingerprint is sensed, one (e.g., the first light emitting elements ED_R) of the first to third light emitting elements ED_R, ED_G, and ED_B positioned in the first area A1 may be turned on to output first color light. The light receiving elements OPD located in the first area A1 may receive reflected light incident after the first color light output from the first light emitting elements ED_R is reflected by the user's hand US_F (see FIG. 7A).

In the meantime, when a pulse wave is sensed as shown in FIG. 7C, the first area A1a may be divided into two sub-areas (hereinafter referred to as a "first sub-area S_A1" and a "second sub-area S_A2"). The first sub-area S_A1 may be a light emitting area in which one (e.g., the first light emitting elements ED_R) of the first to third light emitting elements ED_R, ED_G, and ED_B is turned on to output first color light. The second sub-area S_A2 may be a light receiving area in which light receiving elements are turned on to receive reflected light incident after the first color light is reflected by the user's hand US_F (see FIG. 7A). The first sub-area S_A1 may be located at the center portion of the first area A1, and the second sub-area S_A2 may be a peripheral area disposed to surround the first sub-area S_A1. As an example of the present disclosure, the first sub-area S_A1 may have a circular shape, and the second sub-area S_A2 may have a circular ring shape surrounding the first sub-area S_A1. However, the shapes and positions of the first and second sub-areas S_A1 and S_A2 are not limited thereto, and the shapes and positions of the first and second sub-areas S_A1 and S_A2 may vary depending on the target to be sensed.

Figure 8A:
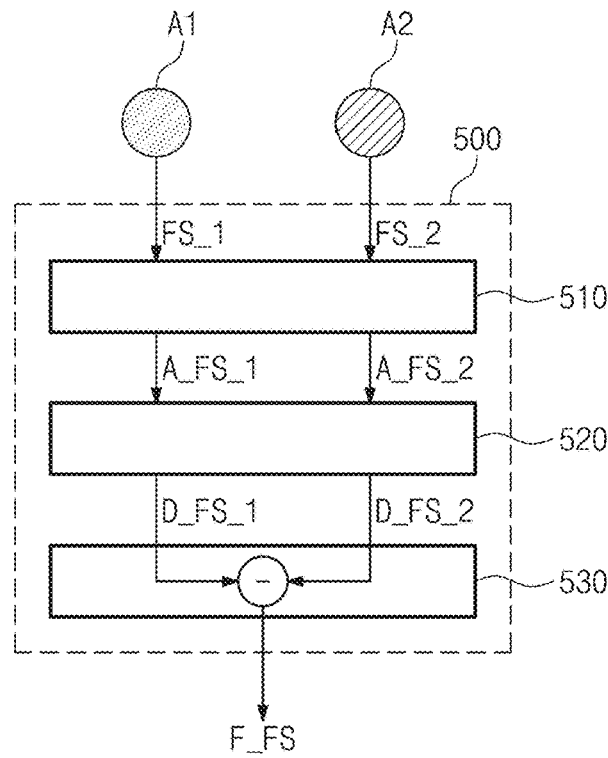
FIG. 8A is a circuit diagram illustrating a readout circuit, according to embodiments of the present disclosure.
Figure 8B:
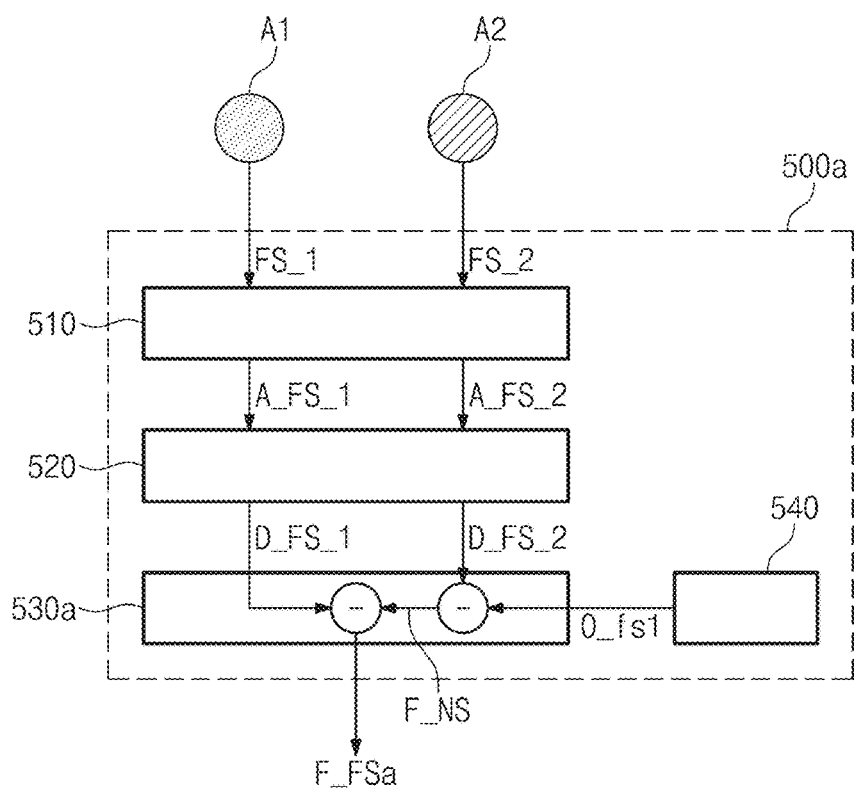
FIG. 8B is a circuit diagram illustrating a readout circuit, according to embodiments of the present disclosure.

FIGS. 8A and 8B are circuit diagrams illustrating a readout circuit, according to embodiments of the present disclosure.

Referring to FIG. 8A, the readout circuit 500 according to an embodiment of the present disclosure may receive a first sensing signal FS_1 from sensors (hereinafter referred to as "first sensors") disposed in the first area A1 of the display panel DP among the plurality of sensors FX (see FIG. 3), and may receive a second sensing signal FS_2 from sensors (hereinafter referred to as "second sensors") disposed in the second area A2 of the display panel DP.

The readout circuit 500 may include a signal acquisition unit 510, a signal conversion unit 520, and a signal operation unit 530. The signal acquisition unit 510 may receive the first sensing signal FS_1 through readout lines connected to first sensors, and may receive the second sensing signal FS_2 through readout lines connected to second sensors. The signal acquisition unit 510 may amplify the received first and second sensing signals FS_1 and FS_2 so as to have a desired size. As an example of the present disclosure, the signal acquisition unit 510 may include charging amplifiers connected to the readout lines.

The signal conversion unit 520 may receive the amplified first and second sensing signals A_FS_1 and A_FS_2, and may convert the amplified first and second sensing signals A_FS_1 and A_FS_2 into signals in a digital format. As an example of the present disclosure, the signal conversion unit 520 may include an analog-to-digital converter.

The signal operation unit 530 may receive first and second sensing signals D_FS_1 and D_FS_2 having a digital format from the signal conversion unit 520, and may calculate the final sensing signal F_FS, from which noise is removed, by subtracting the second sensing signal D_FS_2 from the first sensing signal D_FS_1. As an example of the present disclosure, the noise may be noise that is sensed through a light receiving element after external light (e.g., sunlight, illumination light, or the like) is incident to sensors. The noise caused by the external light may be removed from the first sensing signal D_FS_1 by subtracting the second sensing signal D_FS_2 from the first sensing signal D_FS_1.

The readout circuit 500 may provide the final sensing signal F_FS, from which the noise is removed, to the driving controller 100, and the driving controller 100 may accurately detect user information based on the final sensing signal F_FS.

Referring to FIG. 8B, a readout circuit 500a according to an embodiment of the present disclosure may further include offset storage 540 in addition to the signal acquisition unit 510, the signal conversion unit 520, and a signal operation unit 530a. The second area A2 may be an area where a user's body portion is not located. Accordingly, in the second area A2, external light may be provided to sensors without interference from the user's body portion US_F (see FIG. 7A). Accordingly, a difference in light intensity may occur between external light incident on the first sensors located in the first area A1 and external light incident on the second sensors located in the second area A2.

The offset storage 540 may store an offset signal obtained by reflecting the difference in light intensity in advance. The offset storage 540 may be a non-volatile memory. The offset storage 540 may provide an offset signal O_fs1 to the signal operation unit 530a, and the signal operation unit 530a may process the second sensing signal D_FS_2 based on the offset signal O_fs1. For example, the signal operation unit 530a may generate a final noise signal F_NS by subtracting the offset signal O_fs1 from the second sensing signal D_FS_2. The signal operation unit 530a may calculate a final sensing signal F_FSa by subtracting the final noise signal F_NS from the first sensing signal D_FS_1. Noise caused by external light may be more accurately removed from the first sensing signal D_FS_1 by reflecting the offset signal O_fs1 to the second sensing signal D_FS_2.

The readout circuit 500a may provide the final sensing signal F_FSa, from which noise is removed, to the driving controller 100, and the driving controller 100 may accurately detect user information based on the final sensing signal F_FSa.

Figure 9:
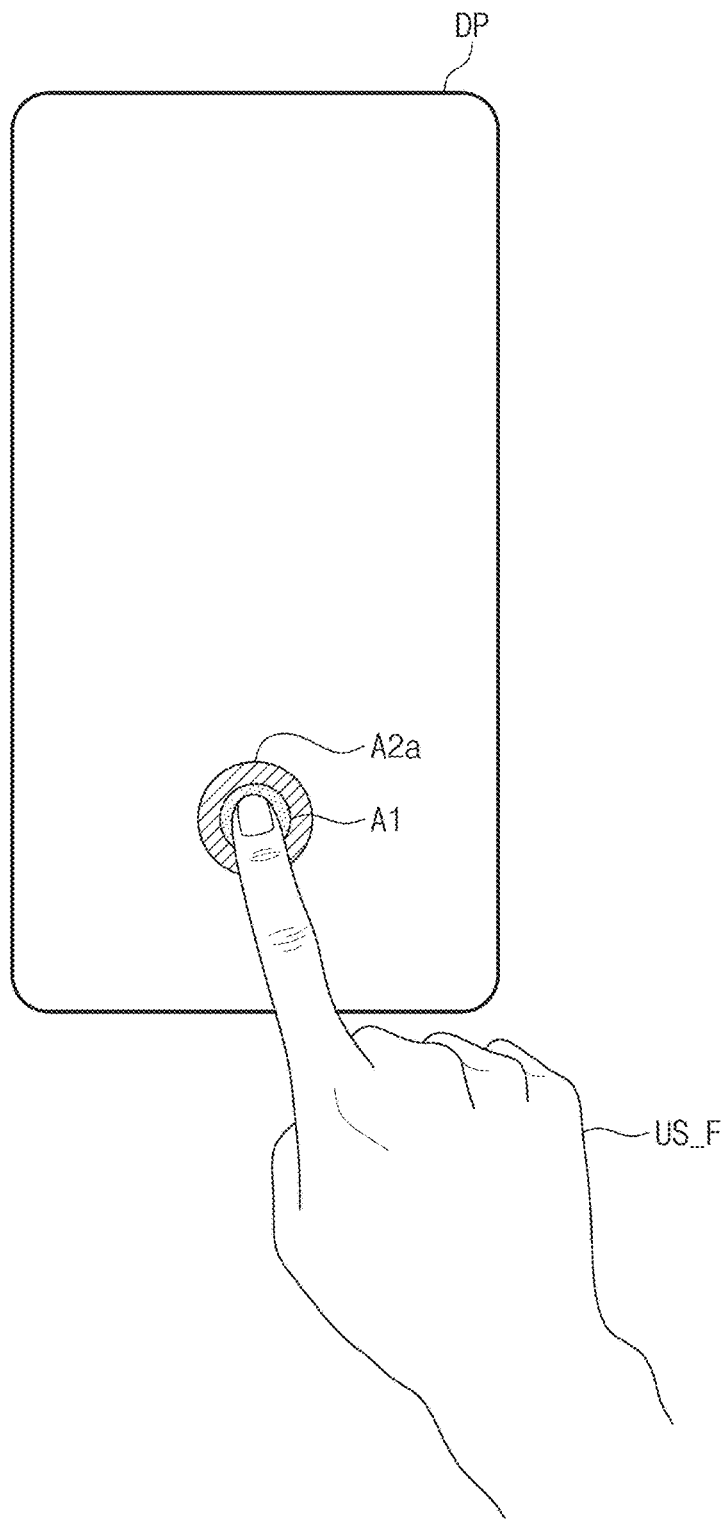
FIG. 9 is a diagram showing first and second areas of a display panel, according to an embodiment of the present disclosure.
Figure 10A:
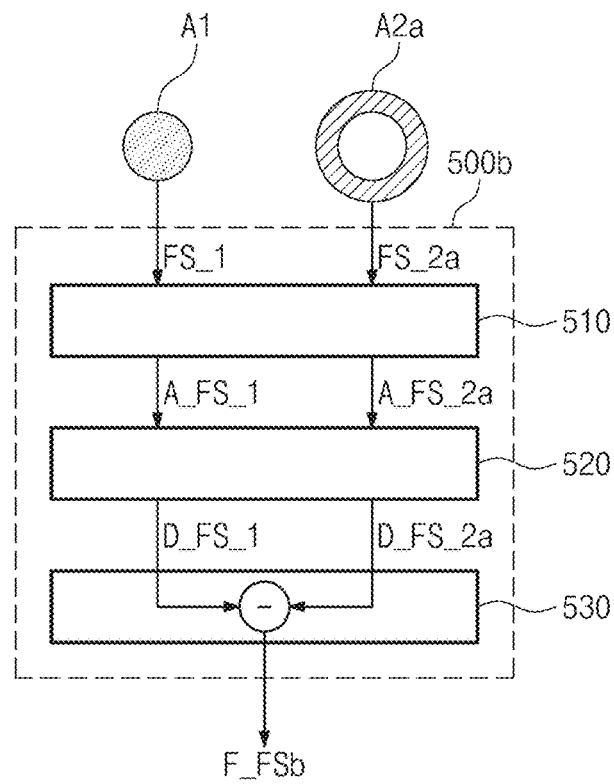
FIG. 10A is a circuit diagram illustrating a readout circuit, according to embodiments of the present disclosure.
Figure 10B:
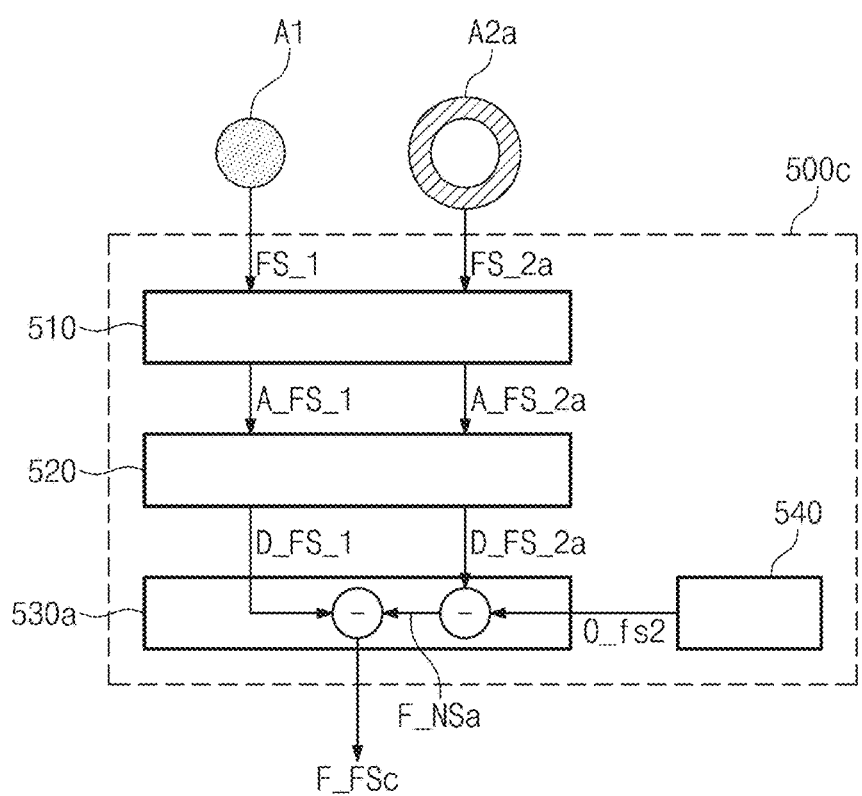
FIG. 10B is a circuit diagram illustrating a readout circuit, according to embodiments of the present disclosure.

FIG. 9 is a diagram showing first and second areas of a display panel, according to an embodiment of the present disclosure. FIGS. 10A and 10B are circuit diagrams illustrating a readout circuit, according to embodiments of the present disclosure.

Referring to FIG. 9, the display panel DP includes a first area A1 for sensing user information and a second area A2a surrounding the first area A1. The first area A1 may be an effective sensing area for sensing user information, and the second area A2a may be a noise sensing area for sensing noise.

The second area A2a may be defined to be immediately adjacent to the first area A1 and to surround the first area A1. As an example of the present disclosure, the second area A2a may partially overlap a user's body portion US_F in contact with the first area A1. As an example of the present disclosure, the second area A2a may have a ring shape surrounding the first area A1.

As an example of the present disclosure, the first area A1 may have a circular, elliptical, or quadrangular shape, and the second area A2a may have a circular ring, elliptical ring, or rectangular ring shape. However, the shapes of the first and second areas A1 and A2a are not particularly limited thereto.

Referring to FIG. 10A, the readout circuit 500b according to an embodiment of the present disclosure may receive the first sensing signal FS_1 from sensors (hereinafter referred to as "first sensors") disposed in the first area A1 of the display panel DP among the plurality of sensors FX (see FIG. 3), and may receive a second sensing signal FS_2a from sensors (hereinafter referred to as "second sensors") disposed in the second area A2a of the display panel DP.

The readout circuit 500b may include a signal acquisition unit 510, a signal conversion unit 520, and a signal operation unit 530. The signal acquisition unit 510 may receive the first sensing signal FS_1 through readout lines connected to first sensors, and may receive the second sensing signal FS_2a through readout lines connected to second sensors. The signal acquisition unit 510 may amplify the received first and second sensing signals FS_1 and FS_2a so as to have a desired size. As an example of the present disclosure, the signal acquisition unit 510 may include charging amplifiers connected to the readout lines.

The signal conversion unit 520 may receive the amplified first and second sensing signals A_FS_1 and A_FS_2a, and may convert the amplified first and second sensing signals A_FS_1 and A_FS_2a into signals in a digital format. As an example of the present disclosure, the signal conversion unit 520 may include an analog-to-digital converter.

The signal operation unit 530 may receive first and second sensing signals D_FS_1 and D_FS_2a having a digital format from the signal conversion unit 520, and may calculate a final sensing signal F_FSb, from which noise is removed, by subtracting the second sensing signal D_FS_2a from the first sensing signal D_FS_1. As an example of the present disclosure, the noise may be noise that is sensed through a light receiving element after external light (e.g., sunlight, illumination light, or the like) is incident to sensors. The noise caused by the external light may be removed from the first sensing signal D_FS_1 by subtracting the second sensing signal D_FS_2a from the first sensing signal D_FS_1.

The readout circuit 500b may provide the final sensing signal F_FSb, from which noise is removed, to the driving controller 100, and the driving controller 100 may accurately detect user information based on the final sensing signal F_FSb.

Referring to FIG. 10B, a readout circuit 500c according to an embodiment of the present disclosure may further include the offset storage 540 in addition to the signal acquisition unit 510, the signal conversion unit 520, and the signal operation unit 530a. The second area A2a may be an area that does not directly contact the user's body portion. Accordingly, in the second area A2a, the user's body portion US_F (see FIG. 7A) may have less interference with external light than in the first area A1. Accordingly, a difference in light intensity may occur between external light incident on the first sensors located in the first area A1 and external light incident on the second sensors located in the second area A2a.

The offset storage 540 may store an offset signal obtained by reflecting the difference in light intensity in advance. The offset storage 540 may provide an offset signal O_fs2 to the signal operation unit 530a, and the signal operation unit 530a may process the second sensing signal D_FS_2a based on the offset signal O_fs2. For example, the signal operation unit 530a may generate a final noise signal F_NSa by subtracting the offset signal O_fs2 from the second sensing signal D_FS_2a. The signal operation unit 530a may calculate a final sensing signal F_FSc by subtracting the final noise signal F_NSa from the first sensing signal D_FS_1. Noise caused by external light may be more accurately removed from the first sensing signal D_FS_1 by reflecting the offset signal O_fs2 to the second sensing signal D_FS_2a.

The readout circuit 500c may provide the final sensing signal F_FSc, from which noise is removed, to the driving controller 100, and the driving controller 100 may accurately detect user information based on the final sensing signal F_FSc.

FIGS. 7A to 10B show that the first area A1 does not overlap the second area A2, but the present disclosure may not be limited thereto. For example, the first and second areas A1 and A2 may partially overlap each other.

Figure 11:
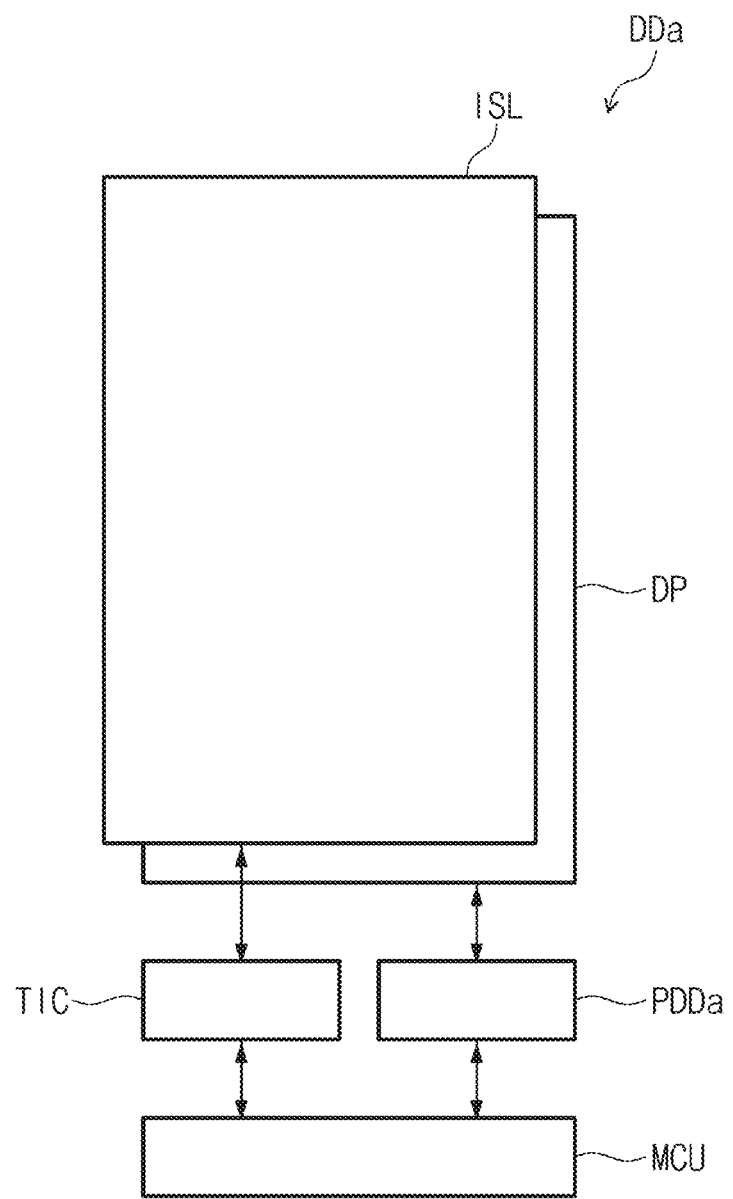
FIG. 11 is a block diagram of a display device, according to an embodiment of the present disclosure.
Figure 12:
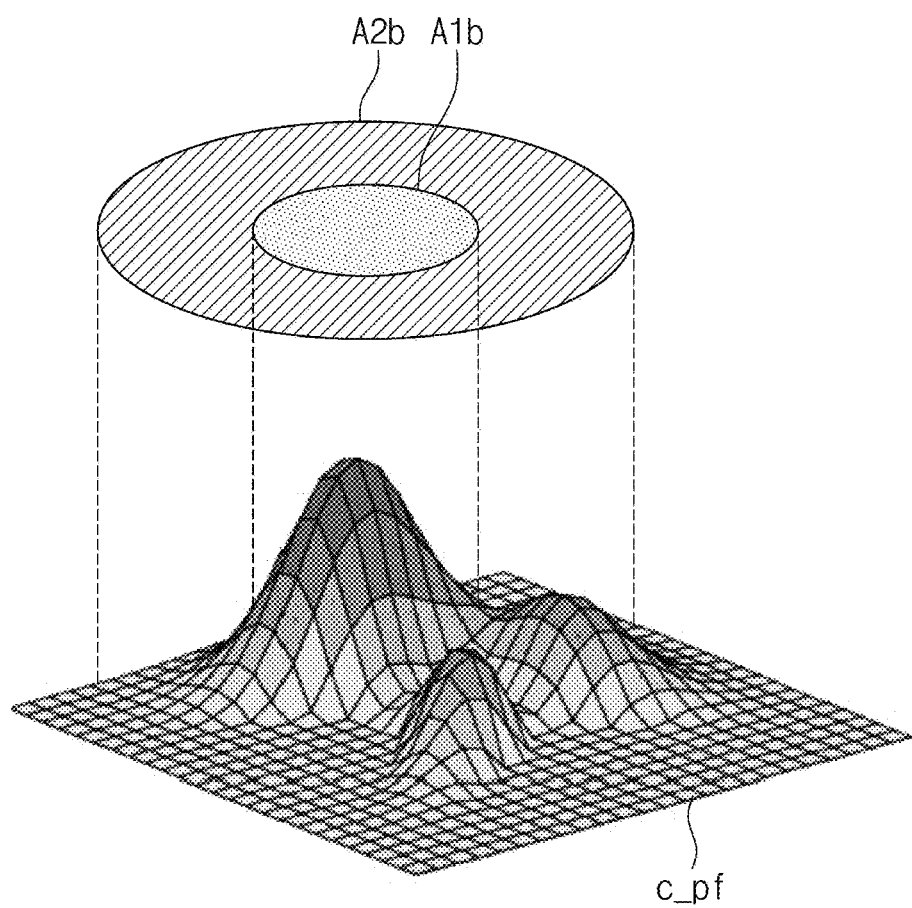
FIG. 12 is a diagram showing a profile of an input sensing signal sensed by an input sensing layer shown in FIG. 11 and first and second areas set to correspond thereto.

FIG. 11 is a block diagram of a display device, according to an embodiment of the present disclosure. FIG. 12 is a diagram showing a profile of an input sensing signal sensed by an input sensing layer shown in FIG. 11 and first and second areas set to correspond thereto.

Referring to FIG. 11 and FIG. 12, a display device DDa according to an embodiment of the present disclosure may include the display panel DP, the input sensing layer ISL, a panel driver PDDa, a sensor controller TIC, and a main controller MCU.

The display panel DP may be a configuration that substantially generates an image. The display panel DP may be a light emitting display panel. For example, the display panel DP may be an organic light emitting display panel, an inorganic light emitting display panel, a quantum dot display panel, a micro-LED display panel, or a nano-LED display panel.

The input sensing layer ISL may be disposed on the display panel DP. The input sensing layer ISL may detect an external input applied from the outside. As an example of the present disclosure, the external input may be a touch input provided by a user. However, the external input is not limited thereto, and may be input by an input device (e.g., active pen, digitizer, etc.).

The main controller MCU may control overall operations of the display device DDa. For example, the main controller MCU may control operations of the panel driver PDDa and the sensor controller TIC. The main controller MCU may include at least one microprocessor, and the main controller MCU may be referred to as a "host". The main controller MCU may further include a graphic controller.

The panel driver PDDa may control the display panel DP. The panel driver PDDa may have the same configuration as the panel driver PDD shown in FIG. 3. Accordingly, a detailed description of the panel driver PDDa will be omitted to avoid redundancy.

The sensor controller TIC may control the input sensing layer ISL. The sensor controller TIC may receive a sensing control signal from the main controller MCU. The sensing control signal may include a clock signal and a mode determination signal for determining an operating mode of the sensor controller.

In an input sensing mode, the sensor controller TIC may calculate coordinate information about an external input based on an input sensing signal received from the input sensing layer ISL and may provide a coordinate signal having the coordinate information to the main controller MCU. The main controller MCU executes an operation corresponding to the external input based on the coordinate signal. For example, the main controller MCU may operate the panel driver PDDa such that a new application image is displayed on the display panel DP based on the coordinate signal.

In a mode of sensing user information, the sensor controller TIC may drive the input sensing layer ISL. When a user touches the display device DDA to provide user information, the input sensing layer ISL may provide the sensor controller TIC with an input sensing signal sensed when the user touches the display device DDA. The sensor controller TIC may generate a contact profile c_pf of the user based on the input sensing signal and may transmit the contact profile c_pf to the main controller MCU. The main controller MCU may set an area actually contacted by a user as a first area A1b based on the contact profile c_pf and may set a peripheral area of the first area A1b as a second area A2b.

In FIGS. 7A to 10B, it is described that the first area A1 is predetermined, but the present disclosure is not limited thereto. As shown in FIG. 12, an area, which is actually touched by the user, may be set as the first area A1b in real time. In FIG. 12, the second area A2b is defined as an area disposed to surround the first area A1b, but the present disclosure is not limited thereto. The second area A2b may be defined as an area, which is spaced from the first area A1b and does not overlap the user's body portion US_F (see FIG. 7A) contacting the first area A1b.

As shown in FIGS. 11 and 12, in setting the first and second areas A1b and A2b in real time by using the input sensing layer ISL and the sensor controller TIC based on an area actually touched by the user, even when the display device DDa senses user information in a sensing area other than the predetermined sensing area, the display device DDa may accurately remove noise caused by external light.

As an example of the present disclosure, one of the main controller MCU or the readout circuit 500 (see FIG. 3) may receive the first sensing signal FS_1 and the second sensing signal FS_2 and may remove noise included in the first sensing signal FS_1 by using the first and second sensing signals FS_1 and FS_2. As shown in FIGS. 8A and 8B, the main controller MCU may include a configuration that generates the final sensing signal F_FS or F_FSa by removing the second sensing signal D_FS_2 from the first sensing signal D_FS_1 or removing the final noise signal F_NS from the first sensing signal D_FS_1. The main controller MCU may be implemented as an integrated circuit.

Figure 13A:
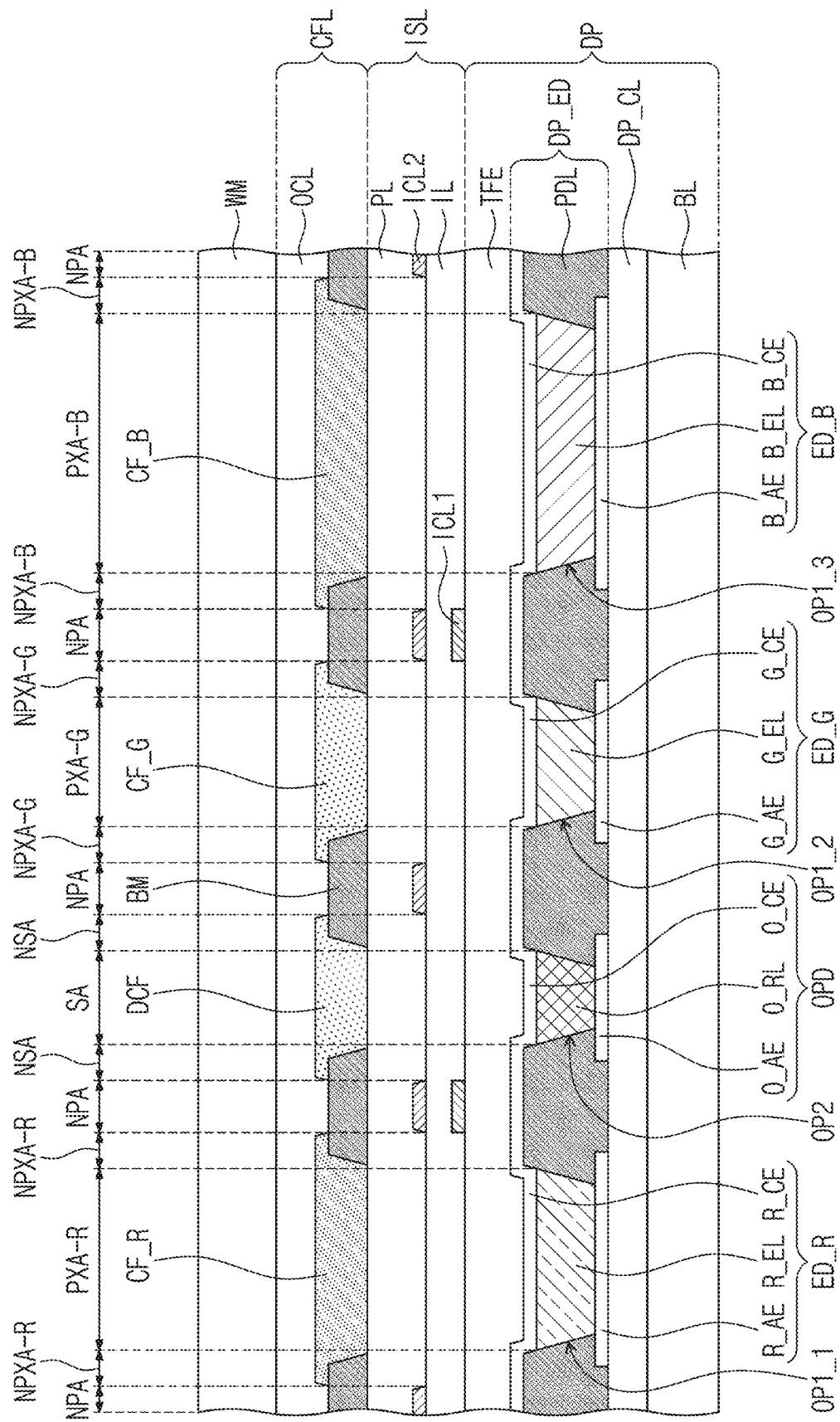
FIGS. 13A and 13B are cross-sectional views illustrating a light emitting element and a light receiving element of a display panel, according to an embodiment of the present disclosure.
Figure 13B:
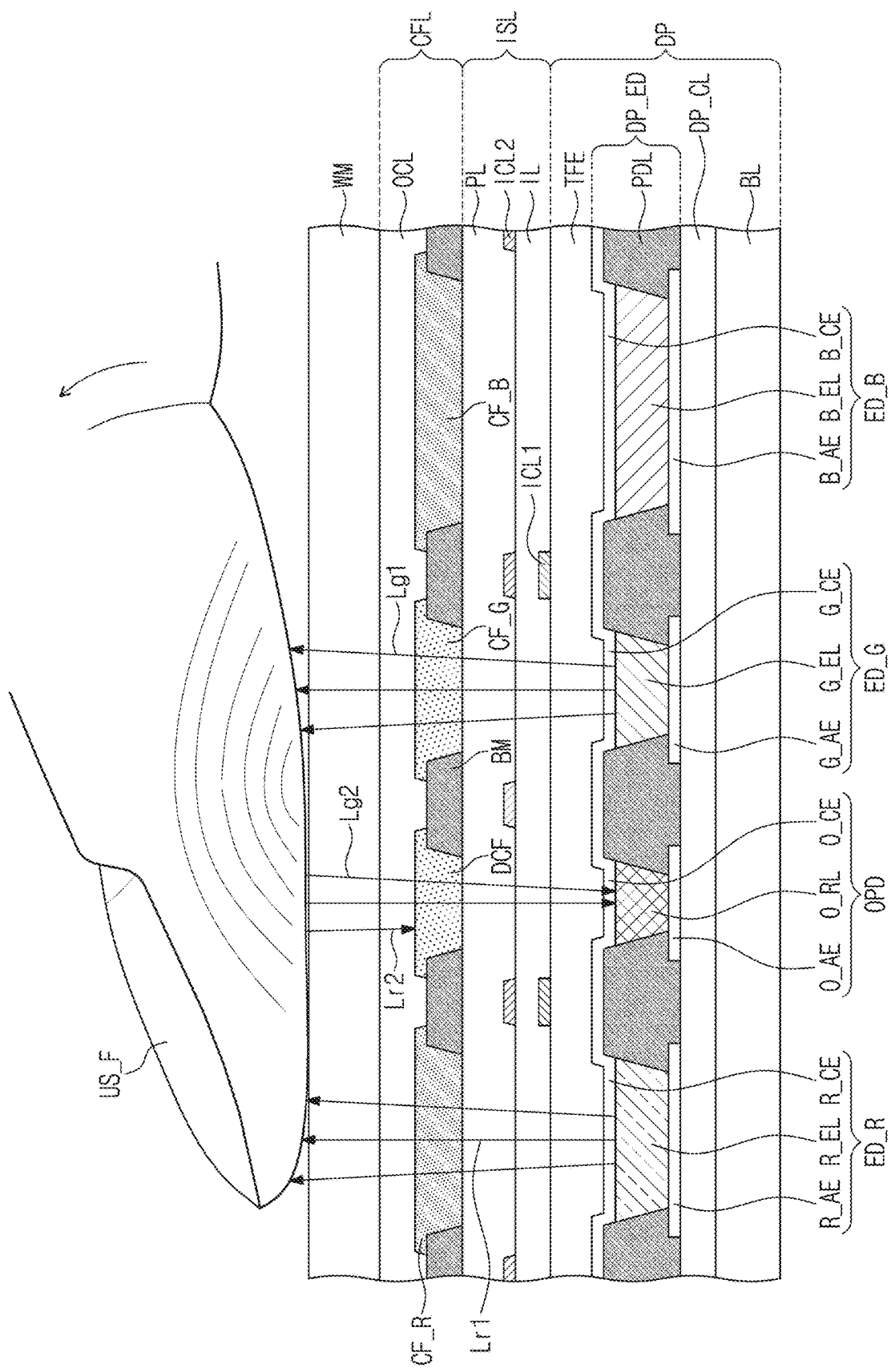

FIGS. 13A and 13B are cross-sectional views illustrating a display device, according to an embodiment of the present disclosure.

Referring to FIGS. 13A and 13B, a first electrode layer is disposed on the circuit layer DP_CL. A pixel defining layer PDL is formed on the first electrode layer. The first electrode layer may include red, green, and blue anode electrodes R_AE, G_AE, and B_AE. The first to third light emitting openings OP1_1, OP1_2, and OP1_3 of the pixel defining layer PDL expose at least part of the red, green and blue anode electrodes R_AE, G_AE, and B_AE, respectively. In an embodiment of the present disclosure, the pixel defining layer PDL may further include a black material. The pixel defining layer PDL may further include a black organic dye/pigment such as carbon black, aniline black, or the like. The pixel defining layer PDL may be formed by mixing a blue organic material and a black organic material. The pixel defining layer PDL may further include a liquid-repellent organic material.

As illustrated in FIG. 13A, the display panel DP may include first to third emission areas PXA-R, PXA-G, and PXA-B and first to third non-emission areas NPXA-G, NPXA-B, and NPXA-R adjacent to the first to third emission areas PXA-R, PXA-G, and PXA-B. The non-emission areas NPXA-R, NPXA-G, and NPXA-B may surround the corresponding emission areas PXA-R, PXA-G, and PXA-B, respectively. In an embodiment, the first emission area PXA-R is defined to correspond to a partial area of the red anode electrode R_AE exposed by the first light emitting opening OP1_1. The second emission area PXA-G is defined to correspond to a partial area of the green anode electrode G_AE exposed by the second light emitting opening OP1_2. The third emission area PXA-B is defined to correspond to a partial area of the blue anode electrode B_AE exposed by the third light emitting opening OP1_3. Non-pixel areas NPA may be defined between the first to third non-emission areas NPXA-R, NPXA-G, and NPXA-B.

A light emitting layer may be disposed on the first electrode layer. The light emitting layer may include red, green, and blue light emitting layers R_EL, G_EL, and B_EL. The red, green, and blue light emitting layers R_EL, G_EL, and B_EL may be disposed in areas corresponding to the first to third light emitting openings OP1_1, OP1_2, and OP1_3, respectively. The red, green, and blue light emitting layers R_EL, G_EL, and B_EL may be formed separately. Each of the red, green, and blue light emitting layers R_EL, G_EL, and B_EL may include an organic material or an inorganic material. The red, green, and blue light emitting layers R_EL, G_EL, and B_EL may generate a predetermined color light. For example, the red light emitting layer R_EL may generate red light; the green light emitting layer G_EL may generate green light; and, the blue light emitting layer B_EL may generate blue light.

In an embodiment, the patterned red, green and blue light emitting layers R_EL, G_EL, and B_EL are shown. However, one light emitting layer may be disposed in the first to third emission areas PXA-R, PXA-G, and PXA-B in common. At this time, the light emitting layer may generate white light or blue light. Also, the light emitting layer may have a multi-layer structure referred to as "tandem".

Each of the red, green, and blue light emitting layers R_EL, G_EL, and B_EL may include a low molecular weight organic material or a high molecular weight organic material as a light emitting material. Alternatively, each of the red, green, and blue light emitting layers R_EL, G_EL, and B_EL may include a quantum dot material as a light emitting material. The core of a quantum dot may be selected from a group II-VI compound, a group III-V compound, a group IV-VI compound, a group IV element, a group IV compound, and a combination thereof.

A second electrode layer is disposed on the red, green and blue light emitting layers R_EL, G_EL, and B_EL. The second electrode layer may include red, green, and blue cathode electrodes R_CE, G_CE, and B_CE. The red, green, and blue cathode electrodes R_CE, G_CE, and B_CE may be electrically connected to one another. In an embodiment of the present disclosure, the red, green, and blue cathode electrodes R_CE, G_CE, and B_CE may have an integral shape. In this case, the red, green, and blue cathode electrodes R_CE, G_CE, and B_CE may be disposed in common in the first to third emission areas PXA-R, PXA-G, and PXA-B, the first to third non-emission areas NPXA-R, NPXA-G, and NPXA-B, and the non-pixel area NPA.

The element layer DP_ED may further include the light receiving element OPD. The light receiving element OPD may be a photodiode. The pixel defining layer PDL may further include a light receiving opening OP2 that is provided to correspond to the light receiving element OPD.

The light receiving element OPD may include a sensing anode electrode O_AE, a photoelectric conversion layer O_RL, and a sensing cathode electrode O_CE. The sensing anode electrode O_AE may be disposed on the same layer as the first electrode layer. That is, the sensing anode electrode O_AE may be disposed on the circuit layer DP_CL and may be simultaneously formed through the same process as the red, green, and blue anode electrodes R_AE, G_AE, and B_AE.

The light receiving opening OP2 of the pixel defining layer PDL exposes at least part of the sensing anode electrode O_AE. The photoelectric conversion layer O_RL is disposed on the sensing anode electrode O_AE exposed by the light receiving opening OP2. The photoelectric conversion layer O_RL may include an organic photo-sensing material. The sensing cathode electrode O_CE may be disposed on the photoelectric conversion layer O_RL. The sensing cathode electrode O_CE may be simultaneously formed through the same process as the red, green, and blue cathode electrodes R_CE, G_CE, and B_CE. As an example of the present disclosure, the sensing cathode electrode O_CE has an integral shape with the red, green, and blue cathode electrodes R_CE, G_CE, and B_CE, thereby forming the common cathode electrode C_CE (see FIG. 6).

The encapsulation layer TFE is disposed on the element layer DP_ED. The encapsulation layer TFE includes at least one inorganic layer or at least one organic layer. In an embodiment of the present disclosure, the encapsulation layer TFE may include two inorganic layers and an organic layer disposed therebetween. In an embodiment of the present disclosure, a thin film encapsulation layer may include a plurality of inorganic layers and a plurality of organic layers, which are alternately stacked.

The encapsulation inorganic layer protects the red, green and blue light emitting elements ED_R, ED_G, and ED_B and the light receiving element OPD from moisture/oxygen, and the encapsulation organic layer protects the red, green and blue light emitting elements ED_R, ED_G, and ED_B and the light receiving element OPD from foreign substances. The encapsulation inorganic layer may include a silicon nitride layer, a silicon oxynitride layer, a silicon oxide layer, a titanium oxide layer, an aluminum oxide layer, or the like, but is not specifically limited thereto. The encapsulation organic layer may include an acryl-based organic layer, and is not specifically limited thereto.

The display device DD includes the input sensing layer ISL disposed on the display panel DP and the color filter layer CFL disposed on the input sensing layer ISL.

The input sensing layer ISL may be directly disposed on the encapsulation layer TFE. The input sensing layer ISL includes a first conductive layer ICL1, an insulating layer IL, a second conductive layer ICL2, and a protective layer PL.

The first conductive layer ICL1 may be disposed on the encapsulation layer TFE. FIGS. 13A and 13B illustrate a structure in which the first conductive layer ICL1 is directly disposed on the encapsulation layer TFE, but the present disclosure is not limited thereto. The input sensing layer ISL may further include a base insulating layer interposed between the first conductive layer ICL1 and the encapsulation layer TFE. In this case, the encapsulation layer TFE may be covered by the base insulating layer, and the first conductive layer ICL1 may be disposed on the base insulating layer. As an example of the present disclosure, the base insulating layer may include an inorganic insulating material.

The insulating layer IL may cover the first conductive layer ICL1. The second conductive layer ICL2 is disposed on the insulating layer IL. A structure in which the input sensing layer ISL includes the first and second conductive layers ICL1 and ICL2 is illustrated. However, the present disclosure is not limited thereto. For example, the input sensing layer ISL may include only one of the first and second conductive layers ICL1 and ICL2.

The protective layer PL may be disposed on the second conductive layer ICL2. The protective layer PL may include an organic insulating material. The protective layer PL may protect the first and second conductive layers ICL1 and ICL2 from moisture/oxygen, and may protect the first and second conductive layers ICL1 and ICL2 from foreign objects.

The color filter layer CFL may be disposed on the input sensing layer ISL. The color filter layer CFL may be disposed directly on the protective layer PL. The color filter layer CFL may include a first color filter CF_R, a second color filter CF_G, and a third color filter CF_B. The first color filter CF_R has a first color; the second color filter CF_G has a second color; and, the third color filter CF_B has a third color. As an example of the present disclosure, the first color may be red; the second color may be green; and, the third color may be blue.

The color filter layer CFL may further include a dummy color filter DCF. As an example of the present disclosure, when an area where the photoelectric conversion layer O_RL is disposed is defined as a sensing area SA, and a periphery of the sensing area SA is defined as a non-sensing area NSA, the dummy color filter DCF may be disposed to correspond to the sensing area SA. The dummy color filter DCF may overlap the sensing area SA and the non-sensing area NSA. As an example of the present disclosure, the dummy color filter DCF may have the same color as one of the first to third color filters CF_R, CF_G, and CF_B. As an example of the present disclosure, the dummy color filter DCF may have the same green color as the second color filter CF_G.

The color filter layer CFL may further include a black matrix BM. The black matrix BM may be disposed to correspond to the non-pixel area NPA. The black matrix BM may be disposed to overlap the first and second conductive layers ICL1 and ICL2 in the non-pixel area NPA. As an example of the present disclosure, the black matrix BM may overlap the non-pixel area NPA and the first to third non-emission areas NPXA-R, NPXA-G, and NPXA-B. The black matrix BM may not overlap the first to third emission areas PXA-R, PXR-G, and PXA-B.

The color filter layer CFL may further include an overcoat layer OCL. The overcoat layer OCL may include an organic insulating material. The overcoat layer OCL may be provided with a thickness sufficient to remove a step between the first to third color filters CF_R, CF_G, and CF_B. A material of the overcoat layer OCL may not be particularly limited as long as the material is capable of planarizing an upper surface of the color filter layer CFL with a given thickness and may include, for example, an acrylate-based organic material.

Referring to FIG. 13B, when the display device DD (see FIG. 1) operates, each of the red, green, and blue light emitting elements ED_R, ED_G, and ED_B may output light. The red light emitting elements ED_R output red light in a red wavelength band; the green light emitting elements ED_G output green light in a green wavelength band; and, the blue light emitting elements ED_B output blue light in a blue wavelength band.

As an example of the present disclosure, the light receiving element OPD may receive light from specific light emitting elements (e.g., the green light emitting elements ED_G) among the red, green, and blue light emitting elements ED_R, ED_G, and ED_B. That is, the light receiving element OPD may receive reflected green light Lg2 reflected by a user's fingerprint after green light Lg1 is output from the green light emitting elements ED_G. The green light Lg1 and the reflected green light Lg2 may have a green wavelength band. A dummy color filter DCF is disposed over the light receiving element OPD. The dummy color filter DCF may have a green color. Accordingly, the reflected green light Lg2 may pass through the dummy color filter DCF and may be incident onto the light receiving element OPD.

Meanwhile, red light and blue light output from the red and blue light emitting elements ED_R and ED_B may also be reflected by the user's hand US_F. For example, when light reflected by the user's hand US_F after red light Lr1 is output from the red light emitting element ED_R is defined as reflected red light Lr2, the reflected red light Lr2 may be absorbed without passing through the dummy color filter DCF. That is, because the reflected red light Lr2 fails to pass through the dummy color filter DCF, the reflected red light Lr2 may not be incident onto the light receiving element OPD. Likewise, even though blue light is reflected by the user's hand US_F, the blue light may be absorbed by the dummy color filter DCF. Accordingly, only the reflected green light Lg2 may be provided to the light receiving element OPD.

FIG. 13B shows that the reflected green light Lg2 is provided to the light receiving element OPD, but the present disclosure is not limited thereto. The reflected red light Lr2 or the reflected blue light may be provided.

According to an embodiment of the present disclosure, it is possible to receive a first sensing signal from a first area for sensing user information, to receive a second sensing signal from a second area other than the first area, and to remove noise caused by external light from the first sensing signal by using the second sensing signal.

Accordingly, a display device may detect user information by using a final sensing signal from which noise is removed, thereby improving the accuracy of sensing user information.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:
1. A display device comprising:
   a display panel including a plurality of pixels and a plurality of sensors, each of the plurality of pixels includes a light emitting element, the plurality of sen- sors include first sensors disposed in a first area and second sensors disposed in a second area, each of the plurality of sensors includes a light receiving element;
a scan driver configured to supply a plurality of scan signals to the plurality of pixels and the plurality of sensors; and
a readout circuit configured to:
in response to the plurality of scan signals,
receive a first sensing signal from the first sensors;
receive a second sensing signal from the second sensors; and
remove noise from the first sensing signal using the second sensing signal to produce a final sensing signal.

2. The display device of claim 1, wherein the first area is an effective sensing area for sensing information of a user, and
wherein the second area is a noise sensing area for sensing the noise.

3. The display device of claim 2, wherein the second area is spaced apart from the first area and does not overlap the effective sensing area.

4. The display device of claim 3, wherein the readout circuit calculates the final sensing signal by subtracting the second sensing signal from the first sensing signal.

5. The display device of claim 3, wherein the readout circuit includes:
an offset storage configured to store a predetermined offset signal, and
wherein the readout circuit calculates a final noise signal by subtracting the offset signal from the second sensing signal, and calculates the final sensing signal by subtracting the final noise signal from the first sensing signal.

6. The display device of claim 1, wherein the first area is an effective sensing area for sensing information of a user, and
wherein the second area is a noise sensing area is adjacent to the effective sensing area and surrounds the effective sensing area.

7. The display device of claim 6, wherein the second area does not overlap the effective sensing area.

8. The display device of claim 7, wherein the readout circuit calculates the final sensing signal by subtracting the second sensing signal from the first sensing signal.

9. The display device of claim 7, wherein the readout circuit includes:
an offset storage configured to store a predetermined offset signal,
wherein the readout circuit calculates a final noise signal by subtracting the offset signal from the second sensing signal, and calculates the final sensing signal by subtracting the final noise signal from the first sensing signal.

10. The display device of claim 1, wherein the first sensors output the first sensing signal, and
wherein the second sensors output the second sensing signal.

11. The display device of claim 10, wherein each of the first sensors or each of the second sensors includes:
a sensor driving circuit connected to the light receiving element, and
wherein the sensor driving circuit includes:
an output transistor configured to receive one of the plurality of scan signals as an output control signal and to output the first sensing signal or the second sensing signal to a readout line in response to the output control signal.

12. An electronic device comprising:
a display panel including a plurality of pixels and a plurality of sensors, each of the plurality of pixels includes a light emitting element, each of the plurality of sensors includes a light receiving element;
an input sensing layer positioned on the display panel and configured to sense an input and to output an input sensing signal;
a scan driver configured to supply a plurality of scan signals to the plurality of pixels and the plurality of sensors; and
a main controller configured to:
set a first area and a second area of the display panel using the input sensing signal;
receive a first sensing signal from first sensors positioned in the first area among the plurality of sensors in response to some of the plurality of scan signals;
receive a second sensing signal from second sensors positioned in the second area among the plurality of sensors in response to some of the plurality of scan signals; and
remove noise from the first sensing signal using the second sensing signal to produce a final sensing signal.

13. The electronic device of claim 12, wherein the first area is an effective sensing area for sensing information of a user, and
wherein the second area is a noise sensing area for sensing the noise, and
wherein the second area is determined from the input sensing signal as an area in which no input is sensed.

14. The electronic device of claim 13, wherein the second area does not overlap the effective sensing area.

15. The electronic device of claim 14, wherein the main controller calculates the final sensing signal by subtracting the second sensing signal from the first sensing signal.

16. The electronic device of claim 14, wherein the main controller includes:
an offset storage configured to store a predetermined offset signal, and
wherein the main controller calculates a final noise signal by subtracting the offset signal from the second sensing signal, and calculates the final sensing signal by subtracting the final noise signal from the first sensing signal.

17. The electronic device of claim 13, wherein the second area does not overlap the effective sensing area.

18. The electronic device of claim 17, wherein the main controller calculates the final sensing signal by subtracting the second sensing signal from the first sensing signal.

19. The display device of claim 17, wherein the main controller further includes:
an offset storage configured to store a predetermined offset signal, and
wherein the main controller calculates a final noise signal by subtracting the offset signal from the second sensing signal, and calculates the final sensing signal by subtracting the final noise signal from the first sensing signal.

20. The electronic device of claim 12, wherein the first sensors output the first sensing signal,
wherein the second sensors output the second sensing signal,
wherein each of the plurality of sensors includes:
a sensor driving circuit connected to the light receiving element, and
wherein the sensor driving circuit includes:

an output transistor configured to receive one of the plurality of scan signals as an output control signal and to output the first sensing signal or the second sensing signal to a readout line in response to the output control signal.

* * * * *